US012714253B2

(12) United States Patent
Ko

(10) Patent No.: US 12,714,253 B2
(45) Date of Patent: Aug. 25, 2026

(54) UNATTENDED-COOKING RICE COOKER DEVICE

(71) Applicant: Soon Jung Ko, Daejeon (KR)

(72) Inventor: Soon Jung Ko, Daejeon (KR)

( * ) Notice: Subject to any disclaimer, the term of this patent is extended or adjusted under 35 U.S.C. 154(b) by 1072 days.

(21) Appl. No.: 17/775,144

(22) PCT Filed: Nov. 9, 2020

(86) PCT No.: PCT/KR2020/015591
§ 371 (c)(1),
(2) Date: May 6, 2022

(87) PCT Pub. No.: WO2021/096175
PCT Pub. Date: May 20, 2021

(65) Prior Publication Data

US 2022/0386801 A1 Dec. 8, 2022

(30) Foreign Application Priority Data

Nov. 11, 2019 (KR) ........................ 10-2019-0143715

(51) Int. Cl.
*A47J 43/24* (2006.01)
*A47J 27/00* (2006.01)
(Continued)

(52) U.S. Cl.
CPC ......... *A47J 27/0802* (2013.01); *A47J 27/004* (2013.01); *A47J 36/321* (2018.08); *A47J 43/24* (2013.01); *A47J 27/14* (2013.01)

(58) Field of Classification Search
CPC ...... A47J 27/0802; A47J 36/321; A47J 43/24; A47J 27/14
(Continued)

(56) References Cited

U.S. PATENT DOCUMENTS 5,156,082 A * 10/1992 Fukuda .............. G05D 23/1951 99/403
2006/0117961 A1* 6/2006 Guo ...................... A47J 27/004 99/348
(Continued)

FOREIGN PATENT DOCUMENTS

JP H01-320017 A 12/1989
JP H05-103728 A 4/1993
(Continued)

OTHER PUBLICATIONS

English Specification of 10-0908665.
(Continued)

*Primary Examiner* — Topaz L. Elliott
*Assistant Examiner* — Solan Oliva

(57) ABSTRACT

The present invention relates to an unattended-cooking rice cooker device in which cooking ingredients such as rice or other grains are supplied, cleaned, and cooked and, more specifically, to an unattended-cooking rice cooker device comprising: a supply unit that divides and stores the cooking ingredients to supply the cooking ingredients; a cleaning unit that receives the cooking ingredients supplied from the supply unit and cleans the cooking ingredients supplied therein while forwardly and backwardly rotating; and a cooking unit including a rice cooker that receives and cooks the cooking ingredients cleaned in the cleaning unit, so as to automatically perform the cleaning and cooking of the ingredients. At the same time, a cleaning drum unit of the cleaning unit can be used as a lid (cap) of the cooking unit including the rice cooker, and thus the number of components can be reduced. In addition, the heat during the cooking is transferred into the cleaning unit to improve hygiene conditions in the cleaning unit.

12 Claims, 21 Drawing Sheets

(51) Int. Cl.

| | |
|---|---|
| ***A47J 27/08*** | (2006.01) |
| ***A47J 36/32*** | (2006.01) |
| *A47J 27/14* | (2006.01) |

(58) Field of Classification Search

USPC .......................................................... 99/325

See application file for complete search history.

(56) References Cited

U.S. PATENT DOCUMENTS

| | | | | |
|---|---|---|---|---|
| 2013/0011537 | A1* | 1/2013 | Vahid ........................ | A23L 5/15 426/523 |
| 2019/0014809 | A1* | 1/2019 | Kawashima .............. | B08B 3/14 |
| 2019/0075956 | A1* | 3/2019 | Bang et al. | |

FOREIGN PATENT DOCUMENTS

| | | | | |
|---|---|---|---|---|
| KR | 20-0215648 | | 3/2001 | |
| KR | 10-2003-0010172 | | 2/2003 | |
| KR | 20-0402213 | | 11/2005 | |
| KR | 10-2006-0011266 | | 2/2006 | |
| KR | 10-0908665 | | 7/2009 | |
| KR | 10-1679167 | | 11/2016 | |
| KR | 10-2019-0129329 | | 11/2019 | |
| WO | WO2008084941 | A1 * | 7/2008 | .............. A47J 43/24 |

OTHER PUBLICATIONS

English Specification of JPH05-103728A.
English Specification of JPH01-320017A.
English Specification of 10-2006-0011266.
English Specification of 10-2003-0010172.
English Specification of 10-1679167.
English Specification of 20-0402213.
English Specification of 20-0215648.
English Specification of 10-2019-0129329.

* cited by examiner (a)

(b)

(a)

(b)

(a)

(b)

(a)

(b)

UNATTENDED-COOKING RICE COOKER DEVICE

TECHNICAL FIELD

The present invention relates to an unattended-cooking rice cooker device supplying, washing, and cooking, e.g., rice or other grains and, more specifically, to an unattended-cooking rice cooker device that includes a feeder separately storing and supplying a predetermined amount of cooking ingredient, a washer receiving the cooking ingredient from the feeder and washing the cooking ingredient by forward and reverse rotations, and a cooker receiving the washed cooking ingredient from the washer and cooking the cooking ingredient and is capable of automatically washing and cooking ingredient while allowing the washing drum itself of the washer to serve as a lid (cap) of the cooker, thereby saving components and providing a sanitary condition in the washer by sending the heat from cooking to the inside of the washer.

BACKGROUND ART

In general, for cooking, a person takes out a required amount of rice from the rice storage container and puts it in a bowl, washes it several times with water, then transfers it to a general electric rice cooker or pressure cooker, adjusts the amount of water according to the type of rice, and then heats it.

The conventional cooking method as described above requires that taking, transferring, and washing rice be manually done except for cooking, leading to difficulty and inconvenience to, e.g., dual-income couples, singles, or children.

Conventionally, various techniques of combining a rice cooker and a rice container have been developed to address the problems. In recent years, several automatic rice cookers have been disclosed which do not require manual work for dispensing, washing, transferring, and boiling water.

However, the conventional unattended-cooking rice cookers have a complicated structure and may cause the rice germ to fall off while washing the rice with a rotary blade.

Further, the conventional unattended-cooking rice cookers have a pressure valve and a valve for water and cooking ingredient in the lid or inner pot body. These valves are vulnerable to high temperature and high pressure and require frequent replacement and repair.

Further, the conventional unattended-cooking rice cookers are mostly used for feeding a great number of people in such a facility as school or military camp and are inappropriate for home use.

To address such drawbacks, the applicant has invented an unattended-cooking rice cooker which was filed on May 10, 2018 for patent and was assigned Korean Patent Application No. 10-2018-0053803. In the unattended-cooking rice cooker, the body of the washing drum, for washing rice, itself is rendered to serve as a lid for the cooker, allowing for cooking with a simplified structure that eliminates the need for installing separate valves for water and grains, on the lid.

PRIOR TECHNICAL DOCUMENTS

Patent Documents (Patent Document 1) KR 10-1679167 registered on Nov. 17, 2016

(Patent Document 2) KR 20-0402213 registered on Nov. 21, 2005.

(Patent Document 3) KR 20-0215648 registered on Dec. 22, 2000

(Patent Document 4) KR 10-2018-0053803 filed on May 10, 2018

DETAILED DESCRIPTION OF THE INVENTION

Technical Problems

The present invention is continuous to the applicant's prior patent and aims to provide an unattended-cooking rice cooker device which includes a feeder for separately storing and supplying rice or other grains, which is a cooking ingredient, a washer for receiving the cooking ingredient from the feeder and washing the cooking ingredient by forward and reverse rotations, and a cooker for receiving the washed cooking ingredient from the washer and cooking the cooking ingredient. After the cooking ingredient is introduced, the cooker is moved up, and the washer is moved down so that a body portion itself of the washer serves as a lid (cap). Thus, it is possible to simplify the configuration of the cooking device by enabling cooking without the need for separate valves, thereby providing an economical effect.

Another object of the present invention is to provide an unattended-cooking rice cooker device in which the feeder, the washer, and the cooker are configured to be drawn in or out of the housing, providing better use of space. The washer is removable to provide easier cleaning and repair.

Another object of the present invention is to provide an unattended-cooking rice cooker device in which the washing blade is provided to wash the cooking ingredient supplied into the washer. The washing blade stirs and washes the cooking ingredient while minimizing the fall-off of rice germs. Provided together with the washing blade is the squeezing blade that sweeps down the washed cooking ingredient to the inner pot body. Thus, it is possible to quickly wash the cooking ingredient while minimizing destruction of nutrients of the cooking ingredient.

Another object of the present invention is to provide a sanitary unattended-cooking rice cooker device in which the washer is heated by the cooking heat from the rice pot generated during cooking, evaporating the moisture present in the washer and preventing germ growth.

Another object of the present invention is to provide an unattended-cooking rice cooker device which has a structure to prevent pipe clogging due to foreign bodies generated during washing, thereby preventing frequent replacement of the pipe.

Another object of the present invention is to provide an unattended-cooking rice cooker device, in which the cooking ingredient is separately stored and may be dispensed in a required amount for cooking. Thus, the unattended-cooking rice cooker device is appropriate for home use.

Another object of the present invention is to provide an unattended-cooking rice cooker device, in which the washer has an open top through which the cooking ingredient is introduced and, when the open top is overturned, discharged, thereby simplifying the configuration of the unattended-cooking rice cooker device.

Another object of the present invention is to provide an unattended-cooking rice cooker device capable of precisely mixing and measuring a plurality of types of grains.

Another object of the present invention is to provide an unattended-cooking rice cooker device, in which a communication unit is provided to be able to mix, wash, and cook a required amount of grains remotely by a smartphone.

Another object of the present invention is to provide an unattended-cooking rice cooker device, in which the inner pot has a front-load structure, reducing necessary space and eliminating separate valves. Thus, the unattended-cooking rice cooker device may be manufactured in compact size, does not require separate valves to thus reduce components, and provides advantageous, such as easy cleaning and maintenance.

MEANS TO ADDRESS THE PROBLEMS

To achieve the foregoing objectives, according to the present invention, an unattended-cooking rice cooker device comprises a feeder 100 receiving and storing a cooking ingredient, a washer 200 installed under the feeder 100 to wash the cooking ingredient, and a cooker 300 installed under the washer 200 to heat and cook the cooking ingredient supplied from the washer 200. The feeder 100, the washer 200, and the cooker 300 slide in along a side surface of a housing 200 including a feeder shelf 410, a washer shelf 420, and a cooker shelf 430. The washer 200 includes an inlet slot 211 through which the cooking ingredient is introduced from the feeder 100 and a hollow washing drum 210 for washing the cooking ingredient. An inner pot body 310 in the cooker 300 receiving the cooking ingredient from the washing drum 210 is spaced apart from a bottom of the washer shelf 420. The washing drum 210 is spaced apart from a top of the washer shelf 420 having a curve corresponding to an outer shape of the washing drum 210. During cooking, the washing drum 210 is pressed down and lowered by a pressurizer to come in tight contact with the washer shelf 420, and the inner pot body 310 is pressed and lifted by a traction driver 330 to come in tight contact with the washer floor 420 so that the washing drum 210 serves as a lid of the inner pot body 310.

According to the present invention, the pressurizer pressurizes a washing drum center shaft 213 fixed coupled to a blade rotation shaft 225 coupled with a blade 220, the blade 220 positioned inside the washing drum to wash the cooking ingredient supplied to an inside of the washing drum 210 and supplying the washed cooking ingredient to the cooker 300.

The traction driver 330 of the present invention is rotated while in tight contact with the inner pot body 310 to lift the inner pot body 310.

According to the present invention, the blade 220 of the washer 200 includes a washing blade 222 washing the cooking ingredient and a squeezing blade 223 supplying the washed cooking ingredient to the cooker 300. The washing blade 222 includes a frame p fixed lengthwise to the blade rotation shaft 225 and a plurality of spacing rods r installed in the frame p to allow the cooking ingredient to be washed while passing through gaps between the spacing rods r. The squeezing blade 223 is fixed coupled to the washing drum center shaft 213 to be positioned opposite to the washing blade 222, the squeezing blade 223 having a plate shape to sweep the washed cooking ingredient.

According to the present invention, the washing drum 200 includes a protruding washing drum center shaft 213. A slide 240 including a bearing is provided to be elongated in a vertical direction on an outer circumferential surface of a drum rotating motor 212 for rotating the washing drum 210 in a frame 230 where the washing drum 210 is rotatably installed. The drum rotating motor 212 is moved down along the slide 240 when the washing drum 210 is lowered by the pressurizer and, when a pressing force of the pressurizer is released, the washing drum center shaft 213 is lifted by a first elastic body 252 and a second elastic body 262 inserted into an inner lower portion of a through hole penetrated by the washing drum center shaft 213 in the frame 230.

According to the present invention, the cooker 300 includes the inner pot body 310 to which the cooking ingredient is supplied through the inlet slot 211 of the washer 200 to be cooked, a container 320 in which the inner pot body 310 is put, the traction driver 330 lifting or lowering the inner pot body 310, and a heating unit 340 including a heater to heat the inner pot body 310.

According to the present invention, the washer shelf 420 includes an open center. The washer shelf 420 has an upper portion having a shape of the washing drum 210 to be tightly contacted by the washing drum 210 when the washing drum 210 is pressed and lowered by the pressurizer has a lower portion having a shape of the inner pot body 310 to be tightly contacted by the inner pot body 310 when the inner pot body 310 is pressed and lifted by the traction driver 330.

According to the present invention, a water inlet 214 and a water outlet 215 are formed on a rear surface of the washing drum 210. A pipe trap 281 is connected to the water inlet 215, a height of the pipe trap 281 varied when water is introduced and when the water is discharged.

According to the present invention, the pipe trap 281 is coupled to an elevator 283 which ascends or descends. The pipe trap 281 is lifted or lowered to be positioned higher or lower than a height of a lower end of the washing drum 210 by an operation of the elevator 283.

According to the present invention, the feeder 100 includes a hollow storage drum part 110 having an open top and an open bottom; a cartridge 120 provided in a space formed inside the storage drum part 110 and having a plurality of storage spaces 122 formed by a plurality of barrier plates 121 installed at a predetermined interval along a circumferential direction around a center axis; and a dispenser 130 installed under the cartridge 120 to open a bottom of any one of the plurality of storage spaces 122 to discharge content.

According to the present invention, the inlet slot 211 which is an opening formed in a top of the washing drum 210 serves as both an inlet for receiving the cooking ingredient and an outlet for discharging the cooking ingredient.

According to the present invention, the washing drum 210 is disposed to be inclined so that a front surface thereof is higher than a rear surface thereof. The washer shelf 420 has an upper portion formed at a same angle as the washing drum 210.

According to the present invention, the unattended-cooking rice cooker device further comprises a display including a controller, formed on a side of the feeder 100, the washer 200, or the cooker 300. The controller includes a keypad for receiving an input directly from a user and a wireless communication unit for receiving a signal from a remote terminal.

Effects of the Invention

Thus, an unattended-cooking rice cooker device of the present invention includes a feeder for separately storing and supplying rice or other grains, which is a cooking ingredient, a washer for receiving the cooking ingredient from the feeder and washing the cooking ingredient by forward and reverse rotations, and a cooker for receiving the washed cooking ingredient from the washer and cooking the cooking ingredient. After the cooking ingredient is introduced, the cooker is moved up, and the washer is moved down so that a body portion itself of the washer serves as a lid (cap). Thus, it is possible to simplify the configuration of the cooking device by enabling cooking without the need for separate valves, thereby providing an economical effect.

In the unattended-cooking rice cooker device of the present invention, the feeder, the washer, and the cooker may be drawn in or out of the housing. As the washer is removable, cleaning and repair are easy.

In unattended-cooking rice cooker device of the present invention, the washing blade is provided to wash the cooking ingredient supplied into the washer. The washing blade stirs and washes the cooking ingredient while minimizing the fall-off of rice germs. Provided together with the washing blade is the squeezing blade that sweeps down the washed cooking ingredient to the inner pot body. Thus, it is possible to quickly wash the cooking ingredient while minimizing destruction of nutrients of the cooking ingredient.

Further, in the unattended-cooking rice cooker device of the present invention, the washing drum is heated by the cooking heat from the inner body pot during cooking, evaporating the moisture remaining in the washing drum and thereby fundamentally preventing germ growth.

The unattended-cooking rice cooker device of the present invention has a structure to prevent pipe clogging due to foreign bodies generated during washing, thereby preventing frequent replacement of the pipe.

Further, in the unattended-cooking rice cooker device of the present invention, the cooking ingredient is separately stored and may be dispensed in a required amount for cooking. Thus, the unattended-cooking rice cooker device is appropriate for home use.

Further, in the unattended-cooking rice cooker device of the present invention, the washer has an open top through which the cooking ingredient is introduced and, when the open top is overturned, discharged. As such, the unattended-cooking rice cooker device has a simplified structure.

Further, in the unattended-cooking rice cooker device of the present invention, it is possible to precisely measure and mix a plurality of types of grains through the dispenser.

Further, in the unattended-cooking rice cooker device of the present invention, a communication unit is provided to be able to mix, wash, and cook a required amount of grains remotely by a smartphone.

In the unattended-cooking rice cooker device of the present invention, the inner pot has a front-load structure, reducing necessary space and eliminating separate valves. Thus, the unattended-cooking rice cooker device may be manufactured in compact size, does not require separate valves to thus reduce components, and provides advantageous, such as easy cleaning and maintenance.

BEST MODE TO PRACTICE THE INVENTION

Figure 1:
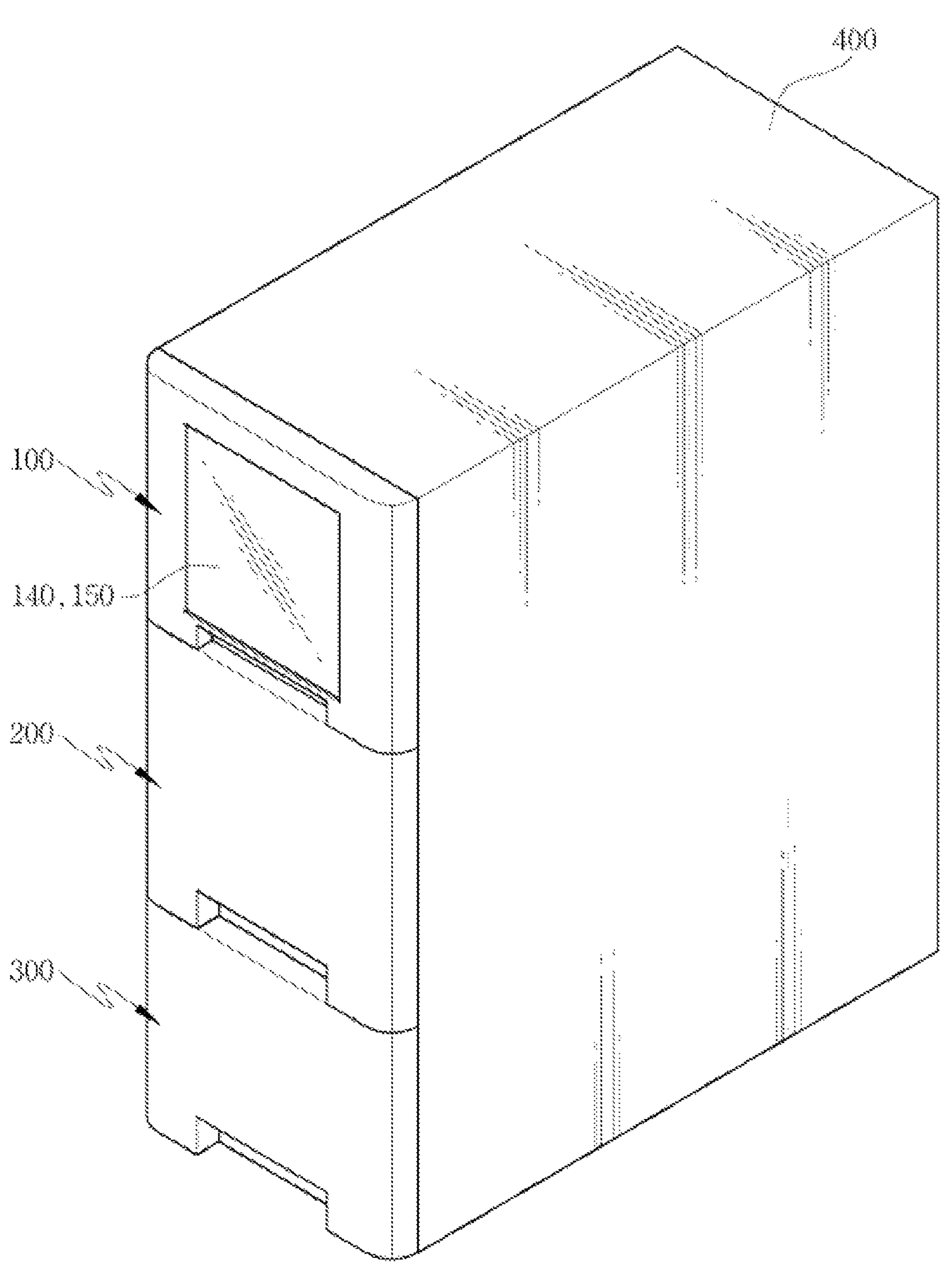
FIG. 1 is a perspective view schematically illustrating an unattended-cooking rice cooker device according to an embodiment of the disclosure.
Figure 2:
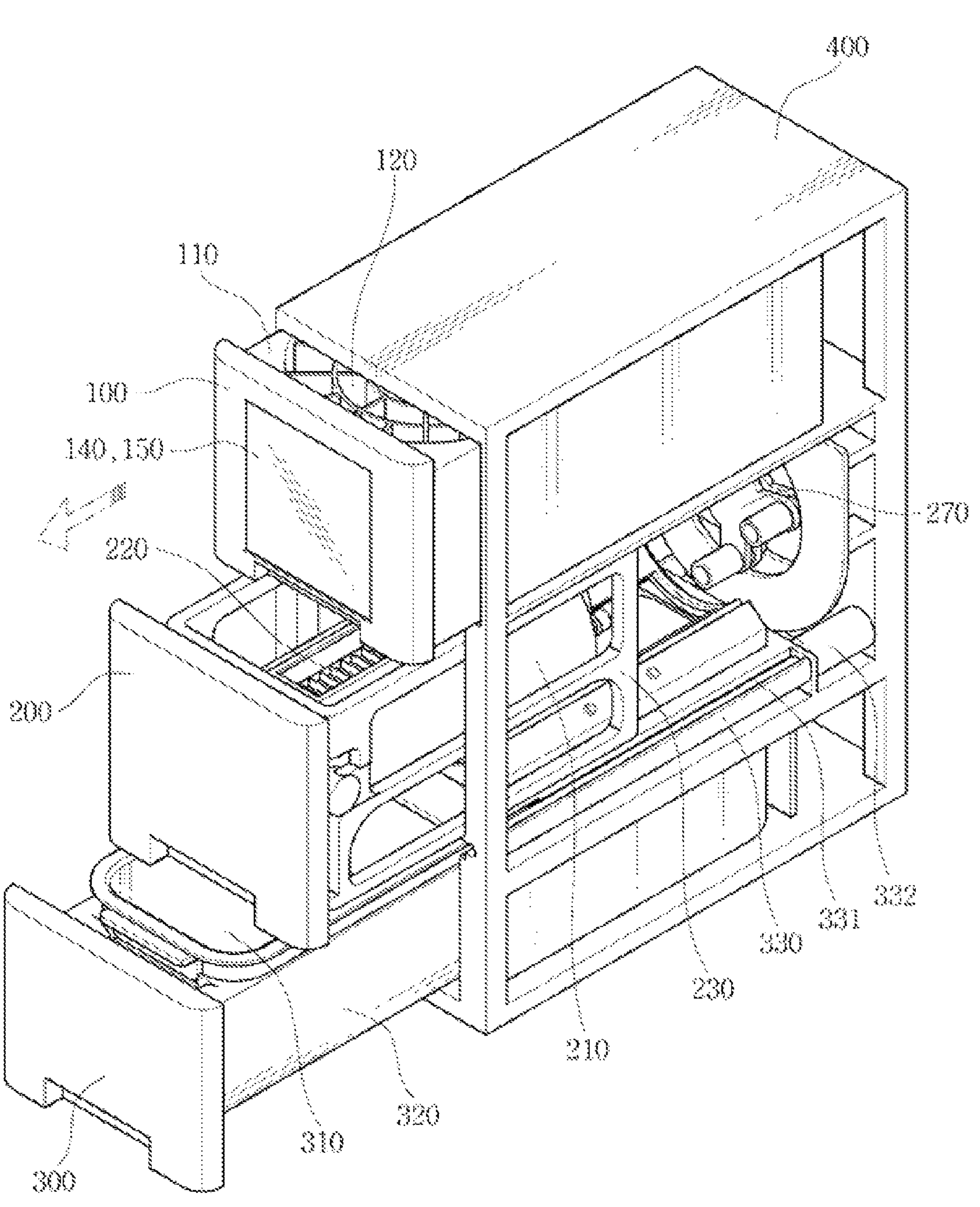
FIG. 2 is a perspective view illustrating a state in which a feeder, a washer, and a cooker are drawn out from a housing in an unattended-cooking rice cooker device, according to an embodiment of the present invention.
Figure 3:
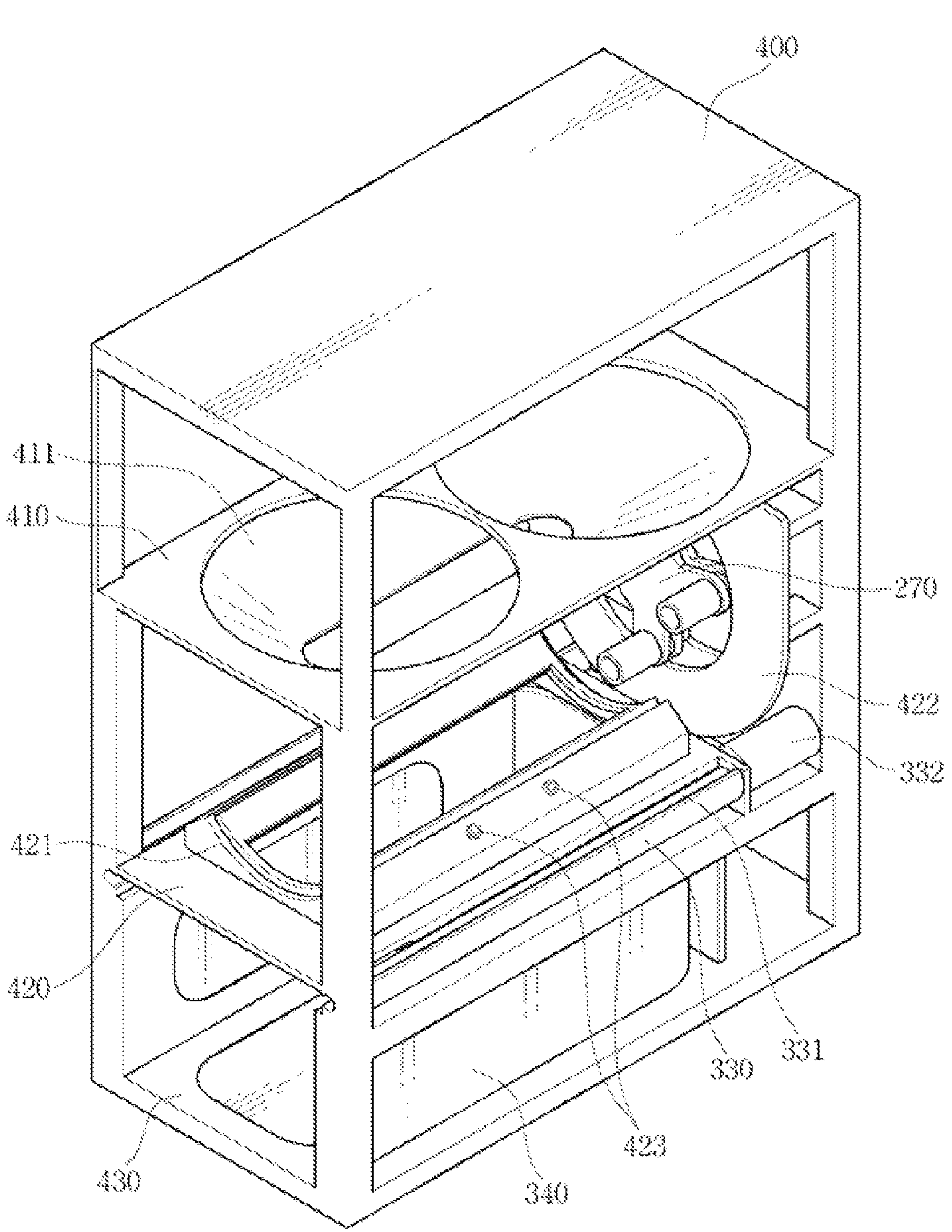
FIG. 3 is a perspective view illustrating a housing in an unattended-cooking rice cooker device according to an embodiment of the present invention.
Figure 4:
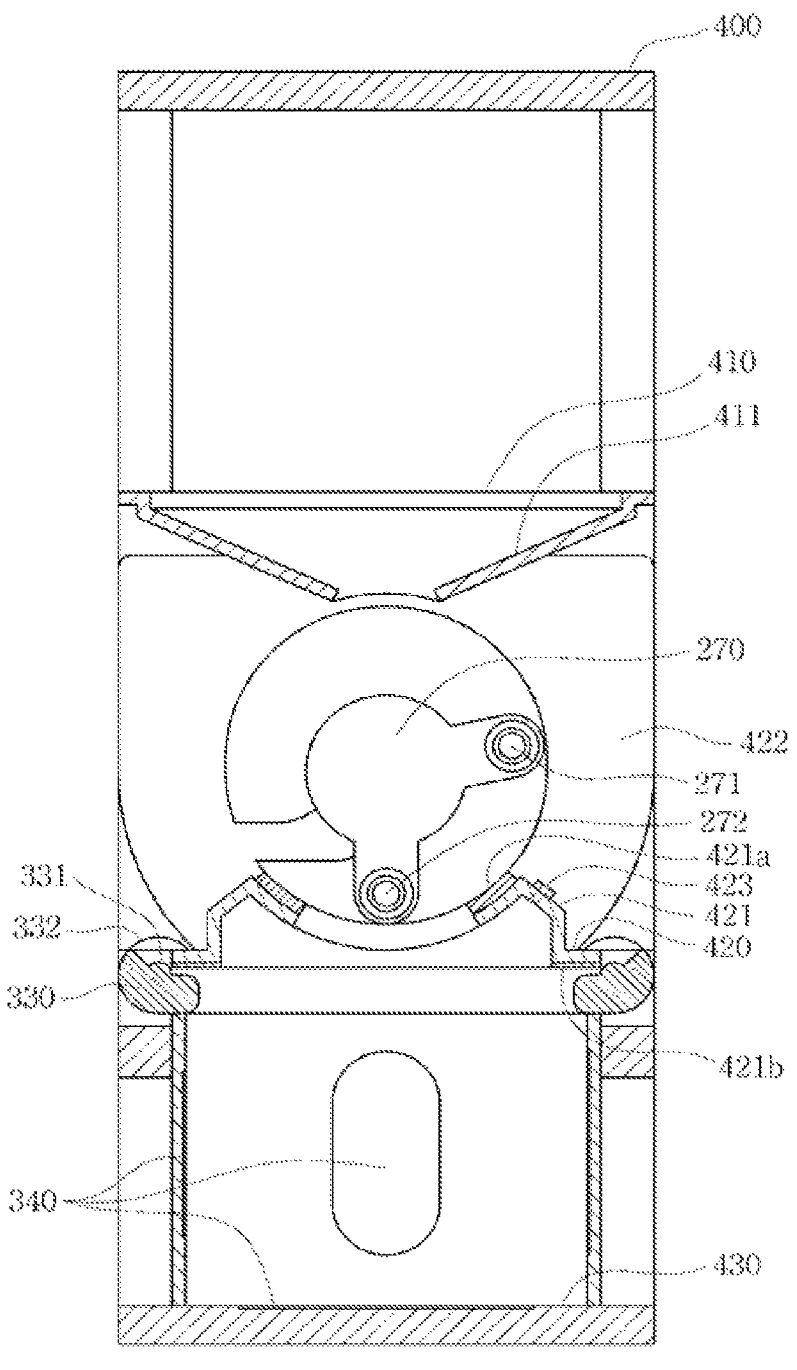
FIG. 4 is a front view illustrating a housing in an unattended-cooking rice cooker device according to the present invention.
Figure 5:
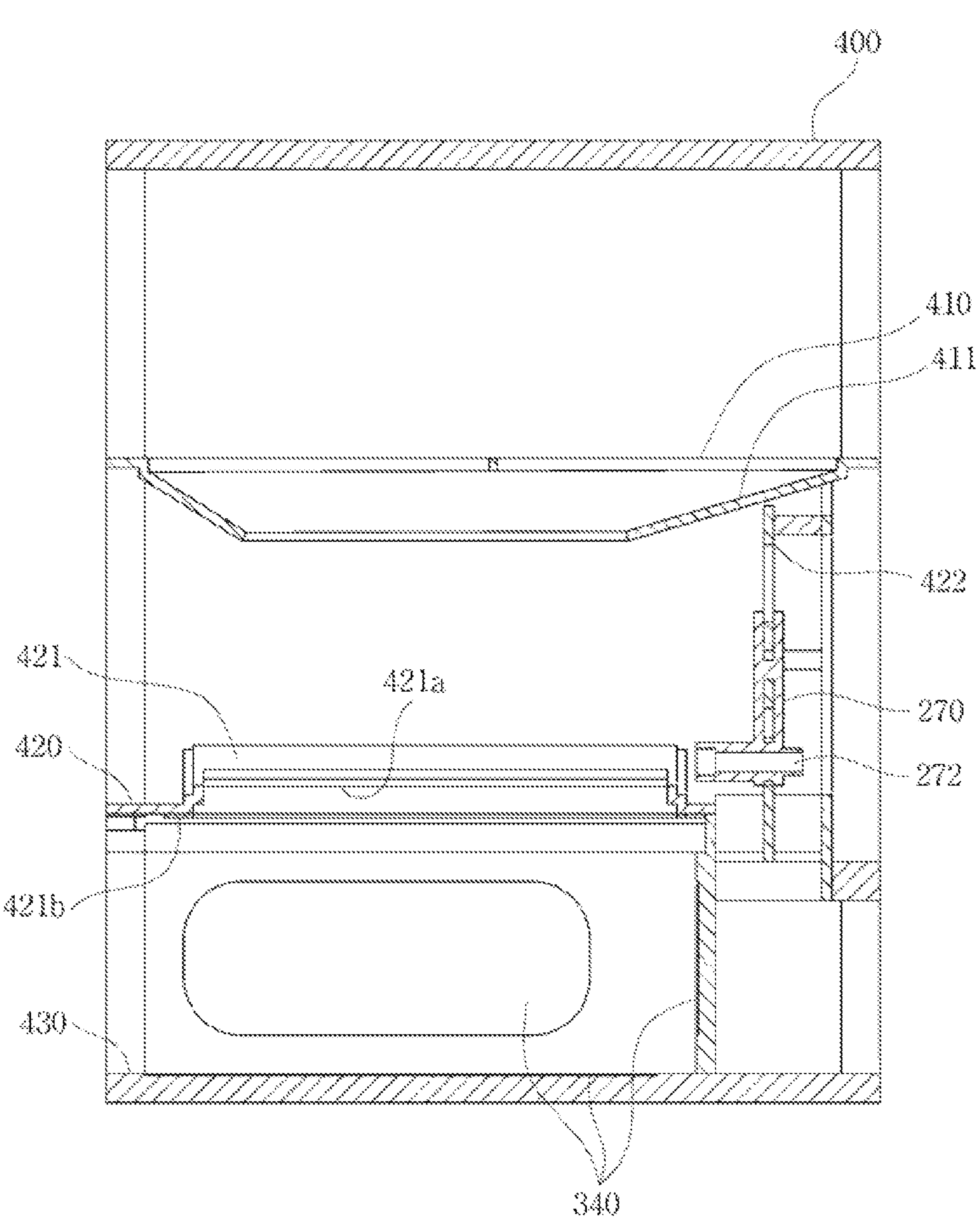
FIG. 5 is a side cross-sectional view illustrating a housing in an unattended-cooking rice cooker device according to the present invention.
Figure 6:
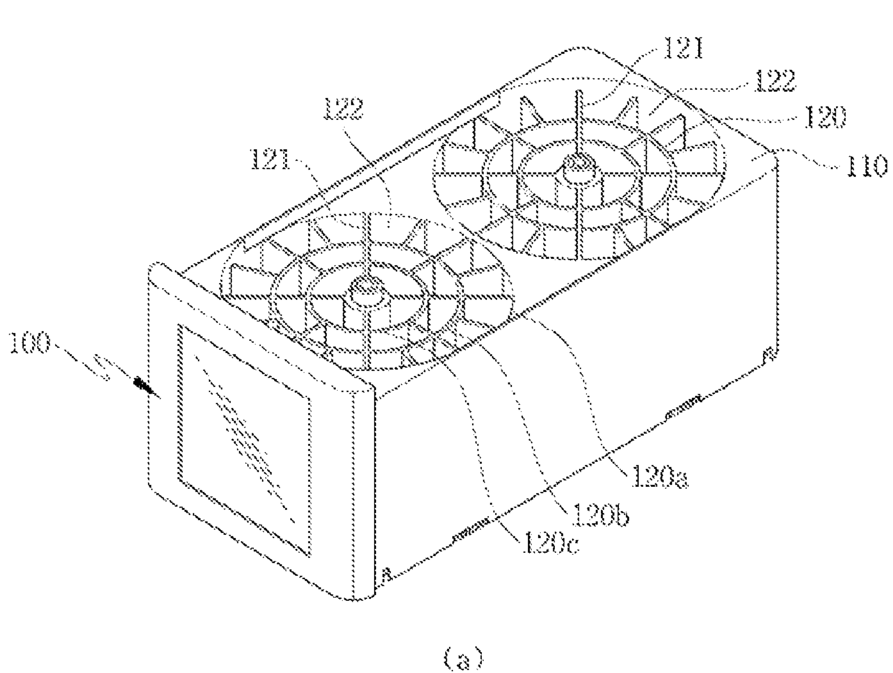
FIG. 6A is a top perspective view illustrating a feeder in an unattended-cooking rice cooker device according to an embodiment of the present invention.
FIG. 6B is a bottom perspective view illustrating a feeder in an unattended-cooking rice cooker device according to an embodiment of the present invention.
Figure 6:
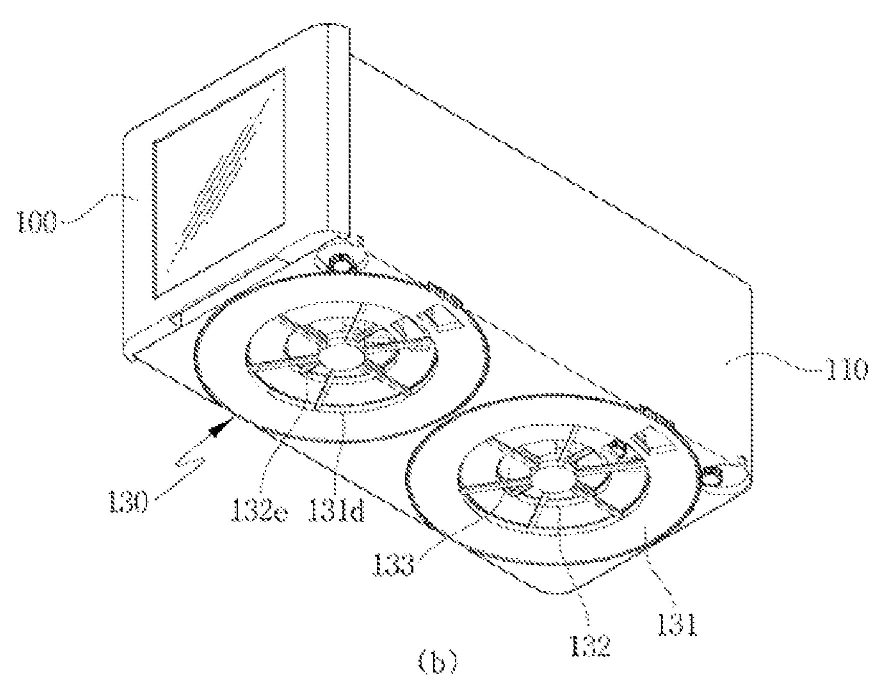
Figure 7:
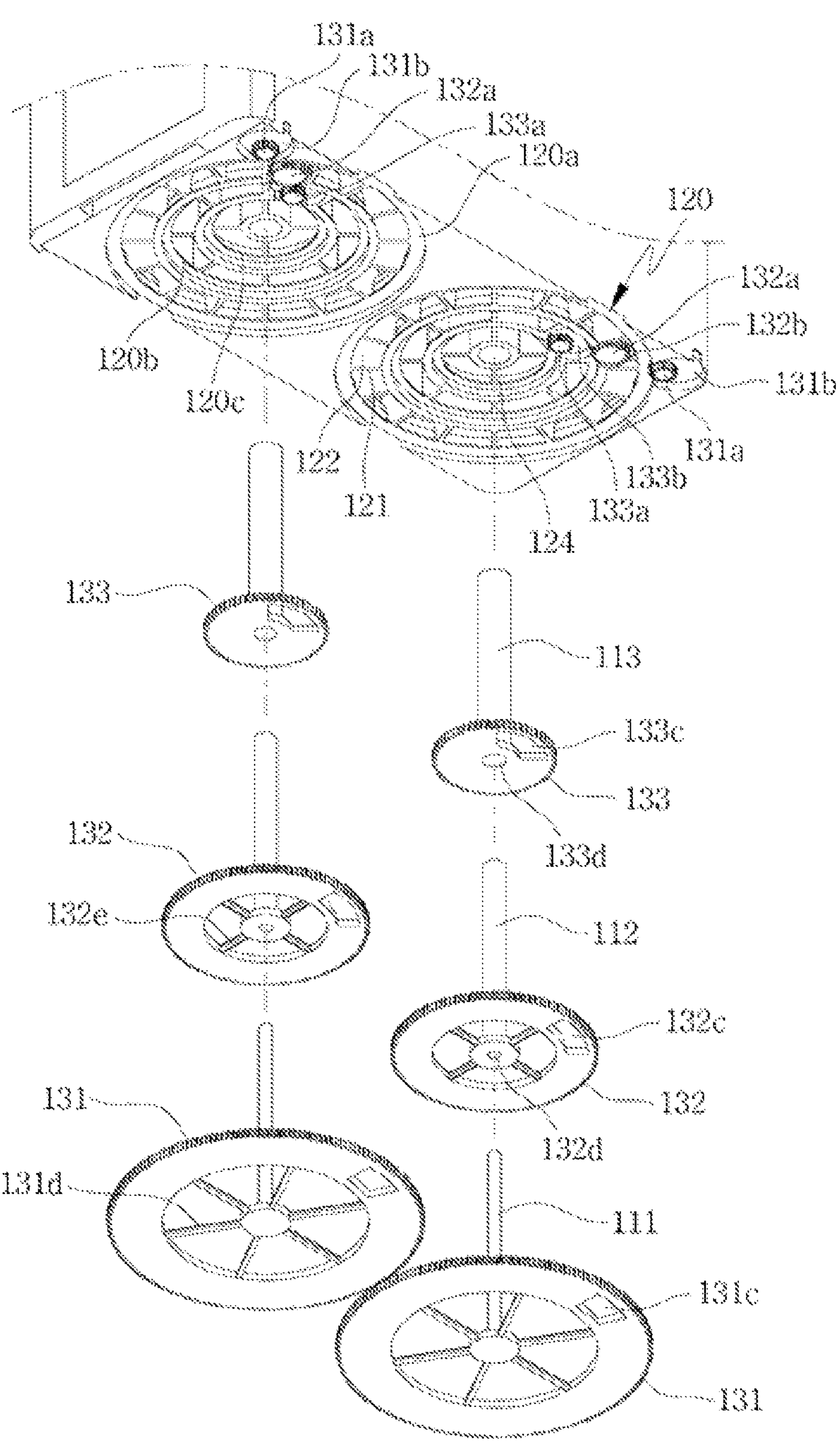
FIG. 7 is a perspective view illustrating a state in which an open/close plate is separated from a storage drum in an unattended-cooking rice cooker device according to the present invention.
Figure 8:
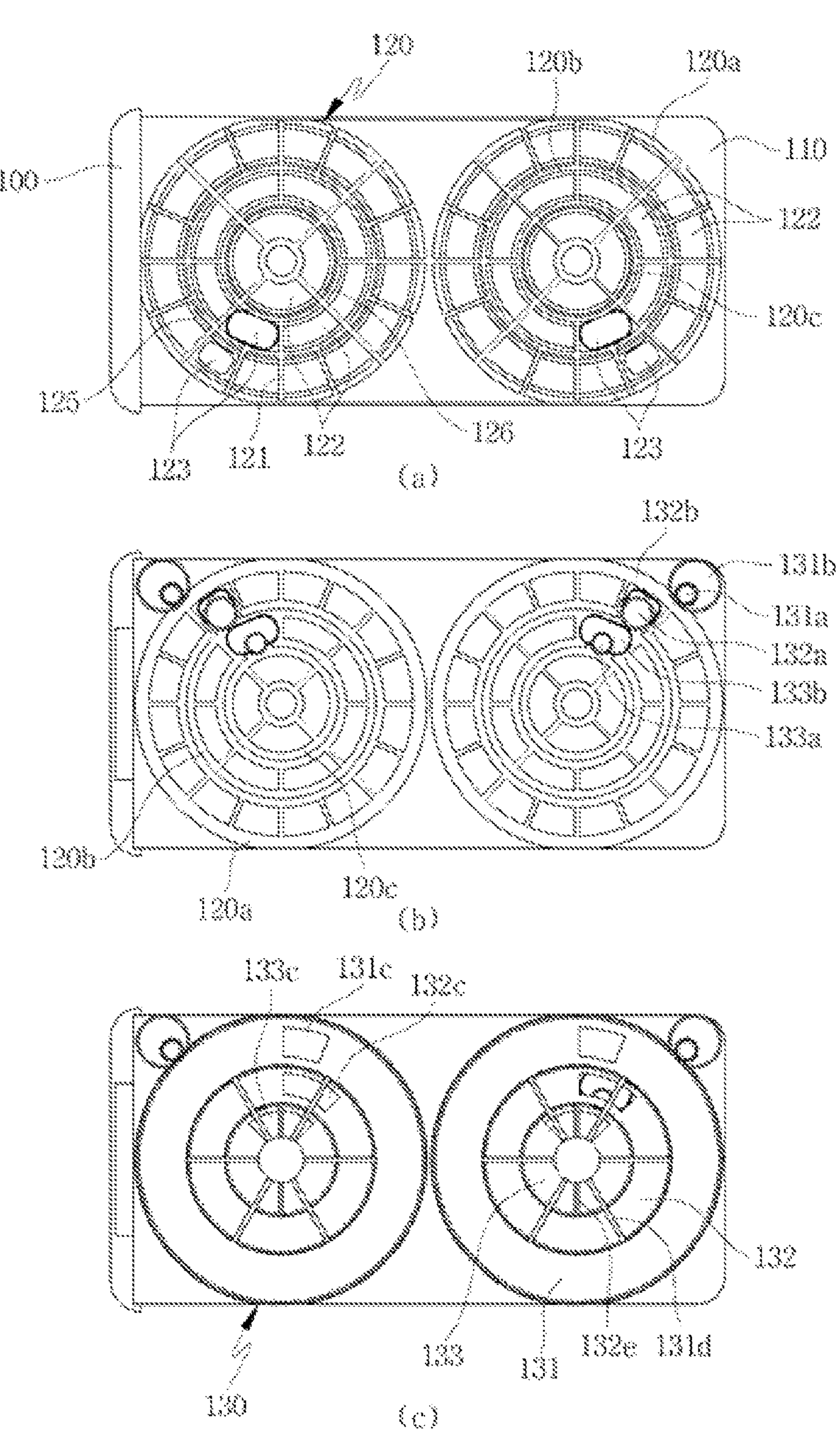
FIG. 8A is a plan view illustrating a feeder in an unattended-cooking rice cooker device according to the present invention.
FIG. 8B is a bottom view illustrating a state in which an open/close plate is separated from a storage drum in an unattended-cooking rice cooker device according to the present invention.
FIG. 8C is a bottom view illustrating a storage drum in an unattended-cooking rice cooker device according to the present invention.
Figure 9:
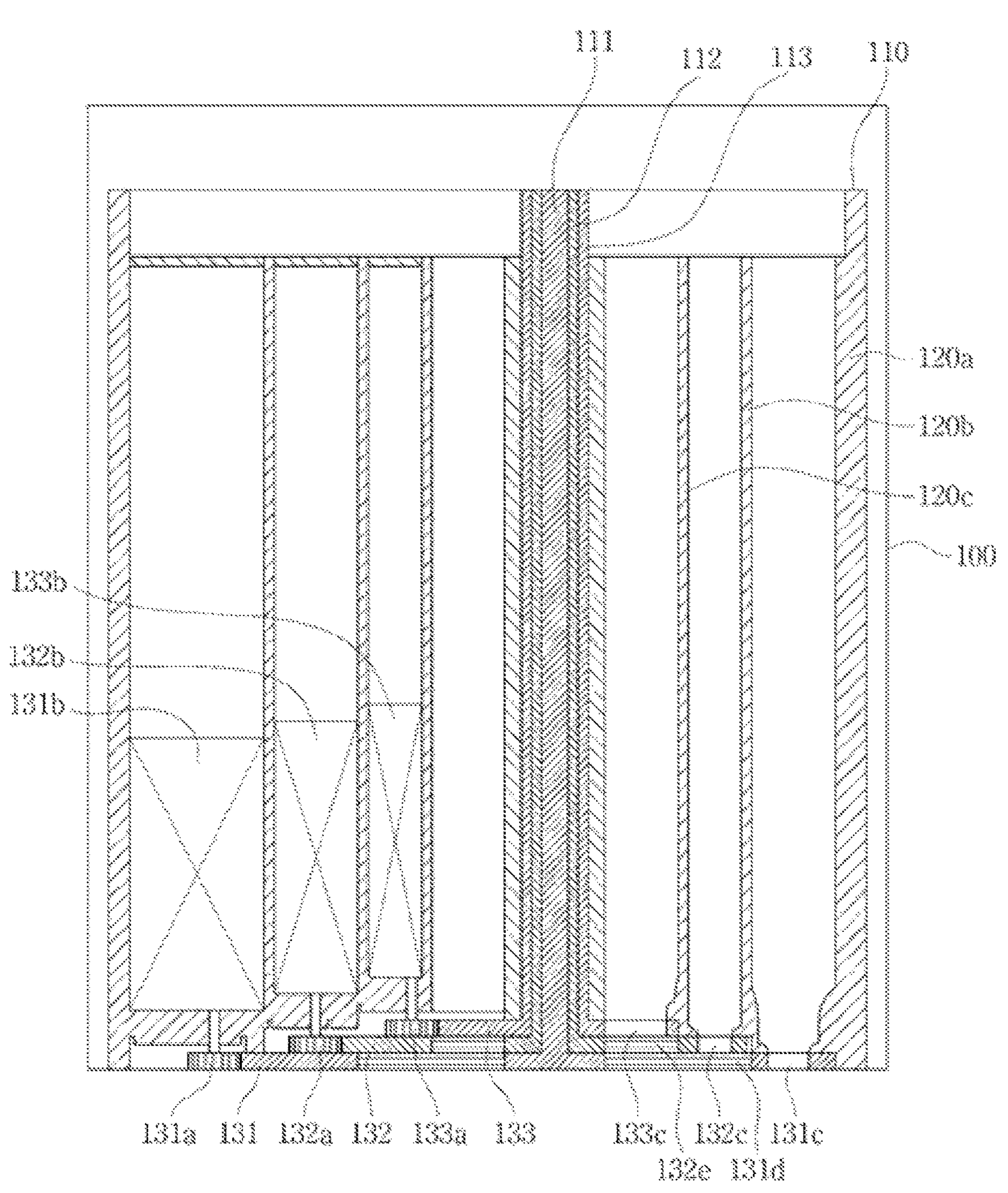
FIG. 9 is a side cross-sectional view illustrating a storage drum in an unattended-cooking rice cooker device according to the present invention.
Figure 10:
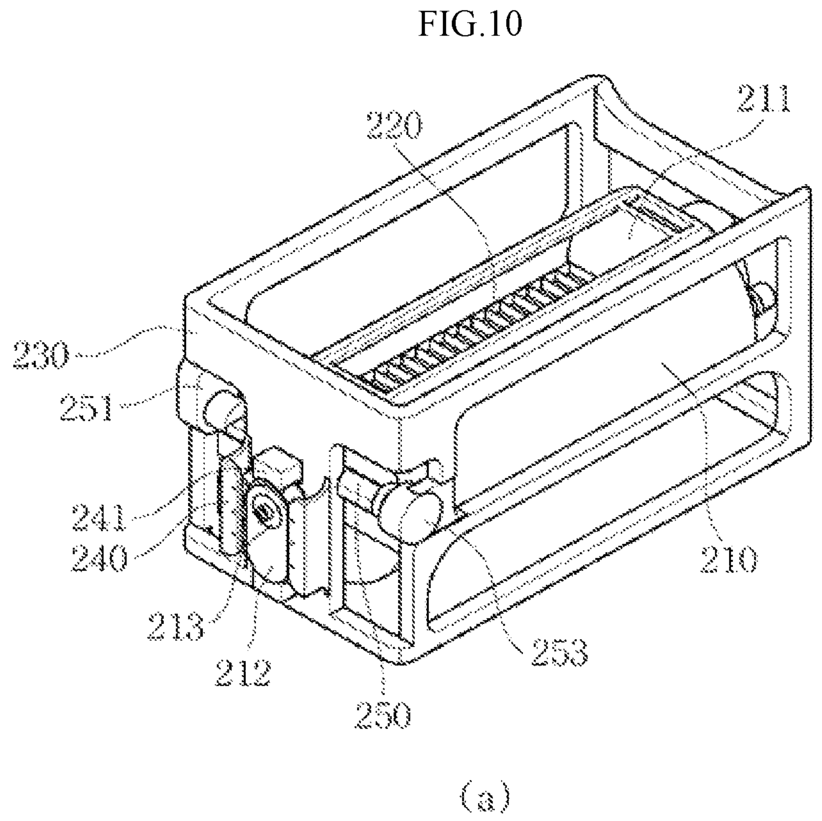
FIG. 10A is a front perspective view illustrating a washer in an unattended-cooking rice cooker device according to the present invention.
FIG. 10B is a rear perspective view illustrating a washer in an unattended-cooking rice cooker device according to the present invention.
Figure 10:
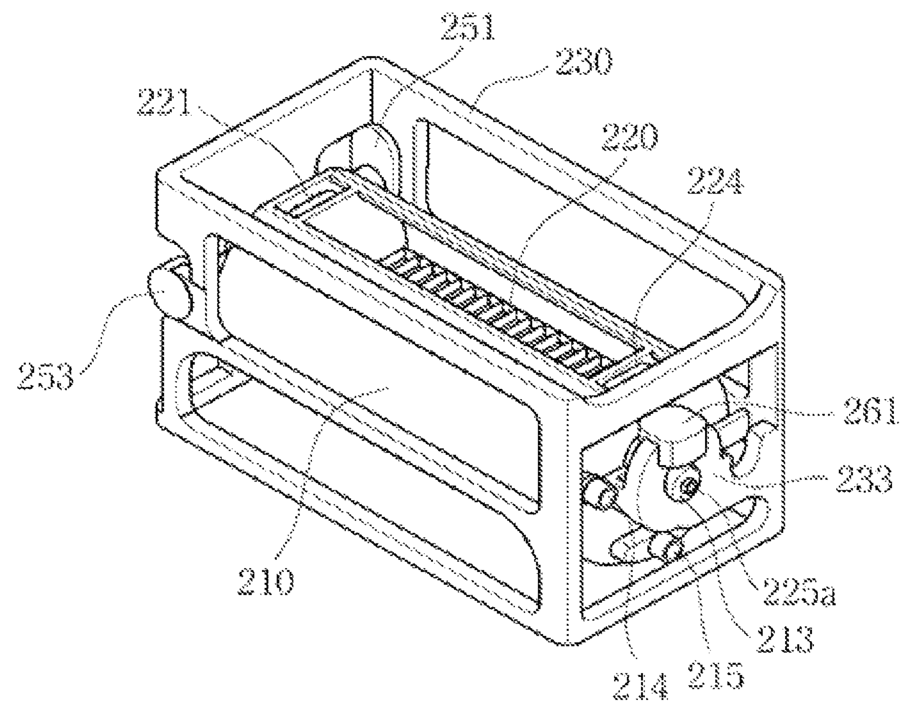

Hereinafter, preferred embodiments of the present invention are described with reference to the accompanying drawings to be easily practiced by one of ordinary skill in the art.

The present invention is an unattended-cooking rice cooker device that dispenses rice or other grains, as a cooking ingredient, and performs washing and cooking as shown in FIGS. 1 to 21.

The unattended-cooking rice cooker device includes a feeder 100 that receives and stores a cooking ingredient, e.g., rice or other grains,

- a washer 200 installed under the feeder 100 and formed of a cylindrical drum for washing the cooking ingredient, and
- a cooker 300 installed under the washer 200 to heat the cooking ingredient supplied from the washer 200 and perform cooking.

The feeder 100 includes a hollow storage drum part 110 which has an open top and open bottom, cartridges 120 provided in a space formed inside the storage drum part 110 and having a plurality of storage spaces 122 formed by a plurality of barrier plates 121 installed at predetermined angular intervals along the circumferential direction around a center axis thereof to receive the cooking ingredient, and a dispenser 130 installed under the cartridges 120 to open the bottom of any one of the plurality of storage spaces 122 to dispense the cooking ingredient.

The washer 200 includes an inlet slot 211 through which the cooking ingredient discharged from the feeder 100 is introduced, a hollow washing drum 210 which is rotated in the forward or reverse direction as a drum rotating motor 212 and a blade 220 inserted to a washing drum center shaft 213, inside the washing drum 210, and rotated as a blade rotating motor 221, which rotates a blade rotation shaft 225 in the forward or reverse direction, is driven, and washing the cooking ingredient supplied into the washing drum 210 and supplying the washed cooking ingredient to the cooker 300.

The cooker 300 includes an inner pot body 310 which receives the cooking ingredient through the inlet slot 211 and performs cooking, a container 320 in which the inner pot body 310 is placed, a traction driver 330 to move up or down the inner pot body 310, and a heating unit 340, which is a heater, to heat the inner pot body 310.

The feeder 100, the washer 200, and the cooker 300 are provided to slide in or out through the front surface along the side surfaces of the housing 400 including a feeder shelf 410, a washer shelf 420, and a cooker shelf 430. The feeder shelf 410 has a feeding guide 411 to guide the cooking ingredient, discharged through the dispenser 130 of the feeder 100, to the inlet slot 211 of the washing drum 210. The washing shelf 420 includes a washing drum support 421 curved to have a shape corresponding to the outer shape of the washing drum 210 to allow the cylindrical washing drum 210 to be seated therein and including steam outlets 423.

In the so-configured unattended-cooking rice cooker device, the dispenser 130 is operated to dispense a desired amount of cooking ingredient from the storage drum part 110 of the feeder 100 to the washing drum 210 of the washer 200. Then, water is supplied to, and discharged out of, the washing drum 210 while washing the cooking ingredient.

The cooking ingredient washed in the washing drum 210 is transported to the cooker 300 and is then subjected to heating and cooking in the cooker 300, and these operations are automatically performed, so that cooking may be done simply and quickly.

In this case, the washing drum 210 is rotated forward so that the cooking ingredient washed in the washer 200 is discharged to the cooker 300 through the inlet slot 211 and, if the washing drum 210 is rotated in the reverse direction so that the inlet slot 211 faces up, a first cam 250 and a second cam 260 (hereinafter, referred to as 'pressurizers') installed on the upper portions of two opposite ends of the washing drum center shaft 213 are rotated to pressurize the washing drum center shaft 213, thereby moving down the washing drum 210, and the traction driver 300 tightly in contact with two opposite edge portions 311 protruding aside from the inner pot body 310 is rotated to lift the inner pot body 310, so that the inner pot body 310 is moved up, and the inside of the inner pot body 310 is sealed off and cooking is performed.

The washing drum 210 according to the present invention needs to be rotated to return to its original position after discharging the introduced cooking ingredient and, to be rotated, should be spaced apart from the washer shelf 420 of the housing 400. The inner pot body 310 of the cooker 300, receiving the cooking ingredient from the washing drum 210, should be slide to the side of the housing 400 and should thus be spaced apart from the washer shelf 420 thereabove.

As such, the inner pot body 310, spaced apart from the washing drum 210 with the washing shelf 420 of the housing 400 disposed therebetween, should be sealed off before heated by the heating unit 340 to cook the cooking ingredient. To that end, the present invention has a pressurizer including the first cam 250 and a second cam 260 to pressurize and lower the washing drum center shaft 213 of the washing drum 210 and a traction driver 330 to lift the inner pot body 310. The pressurizer pressurizes and lowers the washing drum 210 to come in tight contact with the washing shelf 420 of the housing, and the traction driver pressurizes and lifts the inner pot body 310 to come in tight contact with the spaced-apart washing shelf 420 of the housing. In other words, according to the present invention, the washer 200 serves as a lid of the cooker 300 to seal off the cooker. More specifically, the washing drum 210 of the washer serves as a lid (cap) of the inner pot body 310 of the cooker.

Conventional rice cookers have separate valves on the top to seal off the cooking part and closes the valves to increase the internal pressure or opens the valves to decrease the internal pressure. However, the valves deteriorate efficient use of space in the cooker which has a narrow space. It is impossible to simply control water, grains, and steam with one. The plurality of valves may be worn over time, causing failure. Further, the water used for washing is not completely dried out, and germs may grow in the washing tank, causing insanitary conditions. However, according to the present invention, the inlet slot 211 has an open top, and high cooking heat is conducted, completely drying and sterilizing the inside of the washing drum 210 and thus leading to a better sanitary condition.

The storage drum part 110 may separately store rice, other grains, or other grains in their predetermined amounts as shown in FIGS. 6 to 9, and may include one or more hollow drum body.

The feeder 100 including the storage drum part 110 has a handle for sliding the feeder 100 in or out of the housing.

Like the feeder 100, the washer 200 and the cooker 300 also have a handle for drawing in or out by sliding through the front surface the housing 400 along the side surfaces.

A display 150 including a controller 140 may be provided on one side of the feeder 100, washer 200, or cooker 300 to allow the user to set the type and amount of the cooking ingredient, cooking time, and washing time on a keypad, and may display the cooking status. In the drawings, the display and the controller are provided in the feeder 100. A bi-lateral wireless communication unit may be provided on one side of the housing 400 to receive, e.g., the cooking ingredient and cooking time from a remote terminal, such as a smartphone, and transmit the cooking status to the user's terminal.

The cartridges 120 provided in the inner space of the storage drum part 110 includes a first partitioning plate 125 and a second partitioning plate 126 along the circumferential direction in a center portion of the storage space 122 to form triple cartridges including large cartridges 120*a* formed outside the first partitioning plate 125, medium cartridges 120*b* formed between the first partitioning plate 125 and the second partitioning plate 126, and small cartridges 120*c* formed inside the second partitioning plate 126. A first open/close plate 131, a second open/close plate 132, and a third open/close plate 133 are provided under the large cartridge 120*a*, the medium cartridge 120*b*, and the small cartridge 120*c*, respectively.

The dispenser 130 includes the first open/close plate 131, which tightly contacts the bottom surface of the cartridges 120 and rotates about a first center shaft 111, the second open/close plate 132, which is disposed on the first open/close plate 131, rotates about a second center shaft 112 into which the first center shaft 111 is inserted, and has a diameter smaller than the first open/close plate 131, and the third open/close plate 133, which is disposed on the second open/close plate 132, rotates about a third center shaft 113 into which the second center shaft 112 is inserted, and has a diameter smaller than the second open/close plate 132. The first, second, and third open/close plates 1310, 132, and 133 are stacked on over another, forming steps with an appropriate height.

The first open/close plate 131, the second open/close plate 132, and the third open/close plate 133 have teeth formed on their outer circumferential surface and are supported by the first center shaft 111, the second center shaft 112, and third shaft 113, respectively.

The first center shaft 111 supporting the first open/close plate 131 in the center of the first open/close plate 131 passes through a first center shaft insertion hole 132*d*, formed in the center of the second open/close plate 132, and is inserted into the second center shaft 112. The second center shaft 112 supporting the second open/close plate 132 in the center of the second open/close plate 132 passes through a second center shaft insertion hole 133*d*, formed in the center of the third open/close plate 133, and is inserted into the third center shaft 113. The third center shaft 113 supporting the third open/close plate 133 in the center of the third open/close plate 133 is inserted into a third center shaft insertion hole 124 formed in the center of the small cartridge 120*c* to support the third open/close plate 133.

As such, the first open/close plate 131 rotates about the first center shaft 111, the second open/close plate 132 rotates about the second center shaft 112, and the third open/close plate 133 rotates about the third center shaft 113. As such, each open/close plate has a different center shaft.

The first open/close plate 131 has a plurality of first open/close plate supports 131*d* connected to the first center shaft 111 and spaced apart from each other by a predetermined interval to support the first open/close plate 131. The second open/close plate 132 has a plurality of second open/close plate supports 132*e* connected to the second center shaft 112 and spaced apart from each other by a predetermined interval to support the second open/close plate 132.

A first open/close driving gear 131*a* for rotating the first open/close plate 131 and a first operating motor 131*b* for driving the first open/close driving gear 131*a* are configured in the storage drum part 110. A second open/close driving gear 132*a* for rotating the second open/close plate 132 and a second operating motor 132*b* for driving the second open/close driving gear 132*a* are configured in any one storage space 122 of the large cartridges 120*a*, and a third open/close driving gear 133*a* for rotating the third open/close plate 133 and a third operating motor 133*b* for driving the third open/close driving gear 133*a* are configured in any one storage space 122 of the medium cartridges 120*b*. The first open/close plate 131, the second open/close plate 132, and the third open/close plate 133 have a first discharge port 131*c*, a second discharge port 132*c*, and a third discharge port 133*c*, respectively, which communicate with the open bottoms of the respective storage spaces 122 of the large cartridge 120*a*, the medium cartridge 120*b*, and the small cartridge 120*c*.

As such, the first open/close plate 131, the second open/close plate 132, and the third open/close plate 133, respectively, are positioned under the storage spaces of the large cartridge 120*a*, the medium cartridge 120*b*, and the small cartridge 120*c*. The discharge ports are moved by the open/close driving gears and the operating motors to discharge the cooking ingredients stored in the storage spaces without influencing each other despite their individual operations.

The cooking ingredient stored in the large cartridge 120*a* is discharged through the first discharge port 131*c* of the first open/close plate 131, the cooking ingredient stored in the medium cartridge 120*b* is discharged through the second discharge port 132*c* of the second open/close plate 132, and the cooking ingredient stored in the small cartridge 120*c* is discharged through the third discharge port 133*c* of the third open/close plate 133. A pre-stored amount of cooking ingredient may be discharged from each cartridge without concern about excessive discharge, and each cartridge may contain a different type of grains.

As such, the dispenser 130 is provided under the cartridges 120 and opens the bottom of the plurality of storage spaces 122 forming the cartridges 120 to discharge the cooking ingredient stored in the storage space to the washer 200.

In the dispenser 130, if the first open/close driving gear 131*a* is rotated by the operation of the first operating motor 131*b*, the first open/close plate 131 meshed with the first open/close driving gear 131*a* is rotated to align the first discharge port 131*c* to the bottom of any one of the plurality of storage spaces 122 of the large cartridge 120*a*, opens the first discharge port 131*c*, and discharges the cooking ingredient down.

If the second open/close driving gear 132*a* is rotated by the operation of the second operating motor 132*b*, the second open/close plate 132 meshed with the second open/close driving gear 132*a* is rotated to align the second discharge port 132*c* to the bottom of any one of the plurality of storage spaces 122 of the medium cartridge 120*b*, opens the second discharge port 132*c*, and discharges the cooking ingredient down.

If the third open/close driving gear 133*a* is rotated by the operation of the third operating motor 133*b*, the third open/close plate 133 meshed with the third open/close driving gear 133*a* is rotated to align the third discharge port 133*c* to the bottom of any one of the plurality of storage spaces 122 of the small cartridge 120*c*, opens the third discharge port 133*c*, and discharges the cooking ingredient down.

Meanwhile, the storage drum part 110 may be provided in various forms. Besides the above-described configuration, it is possible to supply the cooking material from the cartridge 120 to the washer according to the amount of rotation through a waterwheel-shaped rotator or supply a required amount of cooking ingredient to the washer by rotating a screw. Alternatively, the storage drum part 110 may be replaced with a feeder for supplying a predetermined amount, which has a structure equivalent thereto.

The washer 200 is positioned on the washer shelf 420 which is positioned under the feeder shelf 410 in the housing 400. The washer 200 includes a washing drum 210 for washing the cooking ingredient supplied from the feeder 100, a blade 220 rotated in the washing drum 210 to wash the cooking ingredient, and a frame 230 in which the washing drum 210 is rotatably installed to discharge the washed cooking ingredient down. The washer 200 slides in and out on the washer shelf 420.

The washing drum 210 has a cylindrical shape with the inlet slot 211 in the top. The washing drum center shaft 213 is formed to protrude from the front and rear surfaces of the washing drum 210. Two opposite ends of the blade rotation shaft 225 for rotating the blade are inserted into the washing drum center shaft 213. The blade 220 is fixed-coupled to the blade rotation shaft 225. Inside the washing drum 210 are a blade rotating motor 221 for rotating the blade rotation shaft 225 and a blade vibrating motor 224 for vibrating the blade 220 to make the cooking ingredient fall off the blade 220.

Figure 11:
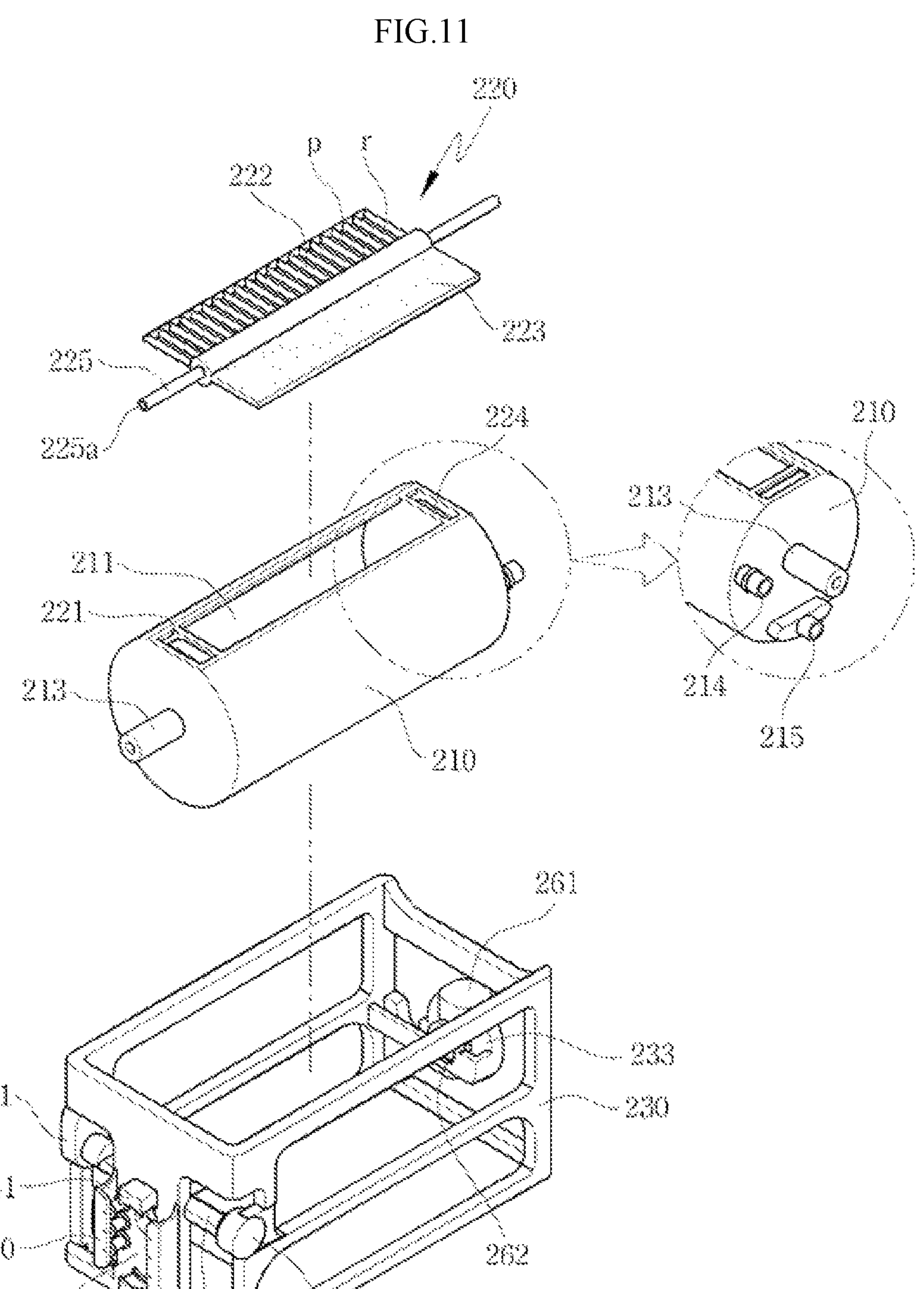
FIG. 11 is a perspective view illustrating a state in which a washer is separated from an unattended-cooking rice cooker device according to the present invention.
Figure 12:
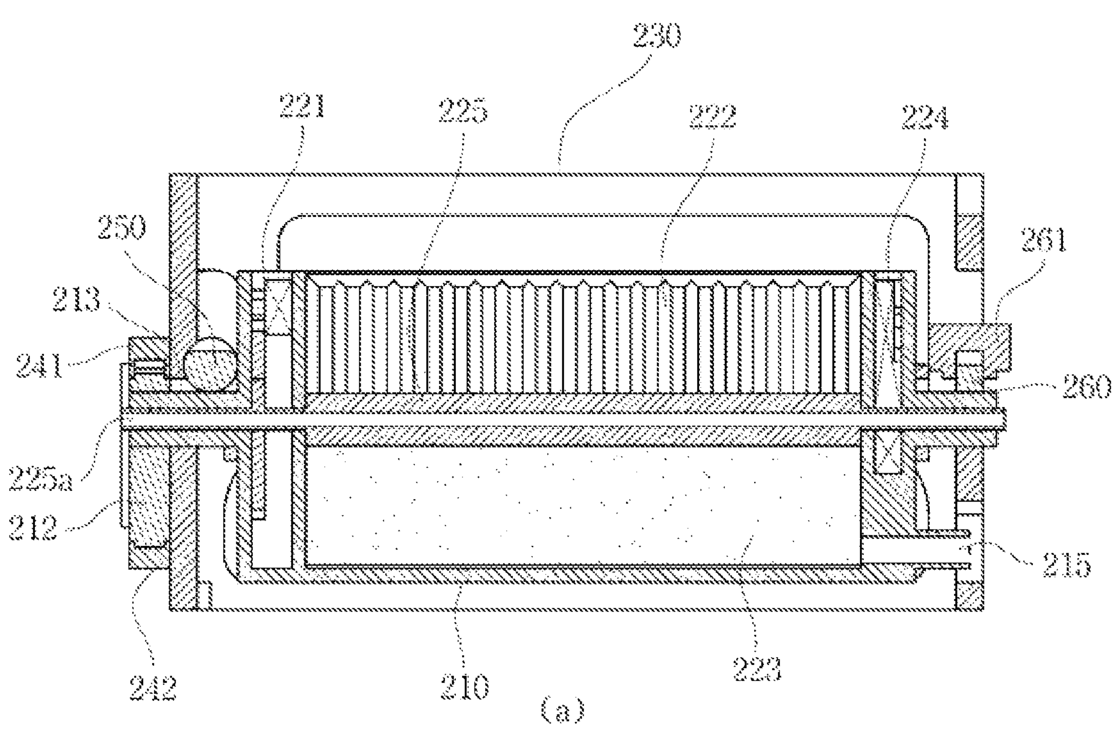
FIG. 12A is a side cross-sectional view illustrating a washer in an unattended-cooking rice cooker device according to the present invention.
FIG. 12B is a front cross-sectional view illustrating a washer in an unattended-cooking rice cooker device according to the present invention.
Figure 12:
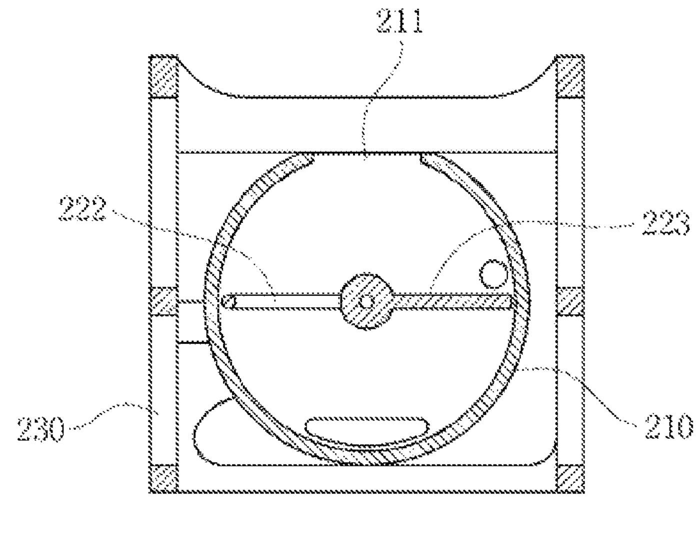

The blade 220 of the washer 200 is installed on the blade rotation shaft 225 to be rotated in the forward or reverse direction and includes a washing blade 222 for sweeping and washing the cooking ingredient and a squeezing blade 222 for supplying the washed cooking ingredient to the cooker 300. As shown in FIG. 11, the washing blade 222 includes a frame p fixed lengthwise to the blade rotation shaft 225 and a plurality of spacing rods r installed inside the frame p. The cooking ingredient may be washed while passing through the gaps between the spacing rods r. The squeezing blade 223 is fixed coupled to the blade rotation shaft 225 on the opposite side from the washing blade 222 and is shaped as plate to sweep the washed cooking ingredient. The frame p may be provided in various shapes, such as a rectangular or wavy shape.

The squeezing blade 223 may be disposed within the inlet slot 211, not perpendicular to the inlet slot 211, when the washing drum 210 is rotated, to allow the cooking ingredient to be discharged only into the inner pot body 310 through the inlet slot 211, thereby preventing the cooking ingredient from falling out.

Figure 17:
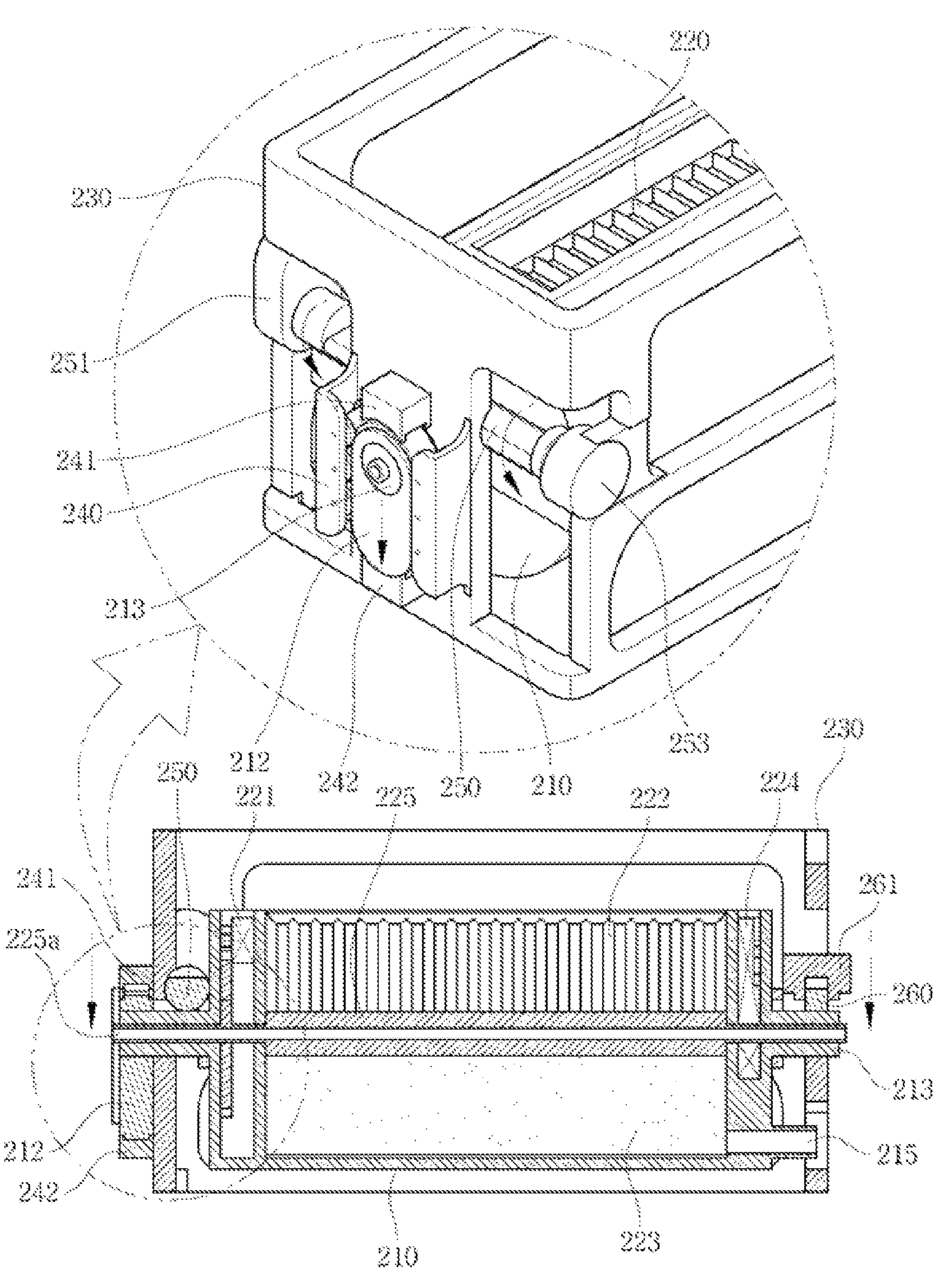
FIG. 17 is a partial perspective view and a side cross-sectional view illustrating a state in which a washing drum is moved down by a pressurizer in a washer of an unattended-cooking rice cooker device according to the present invention.
Figure 18:
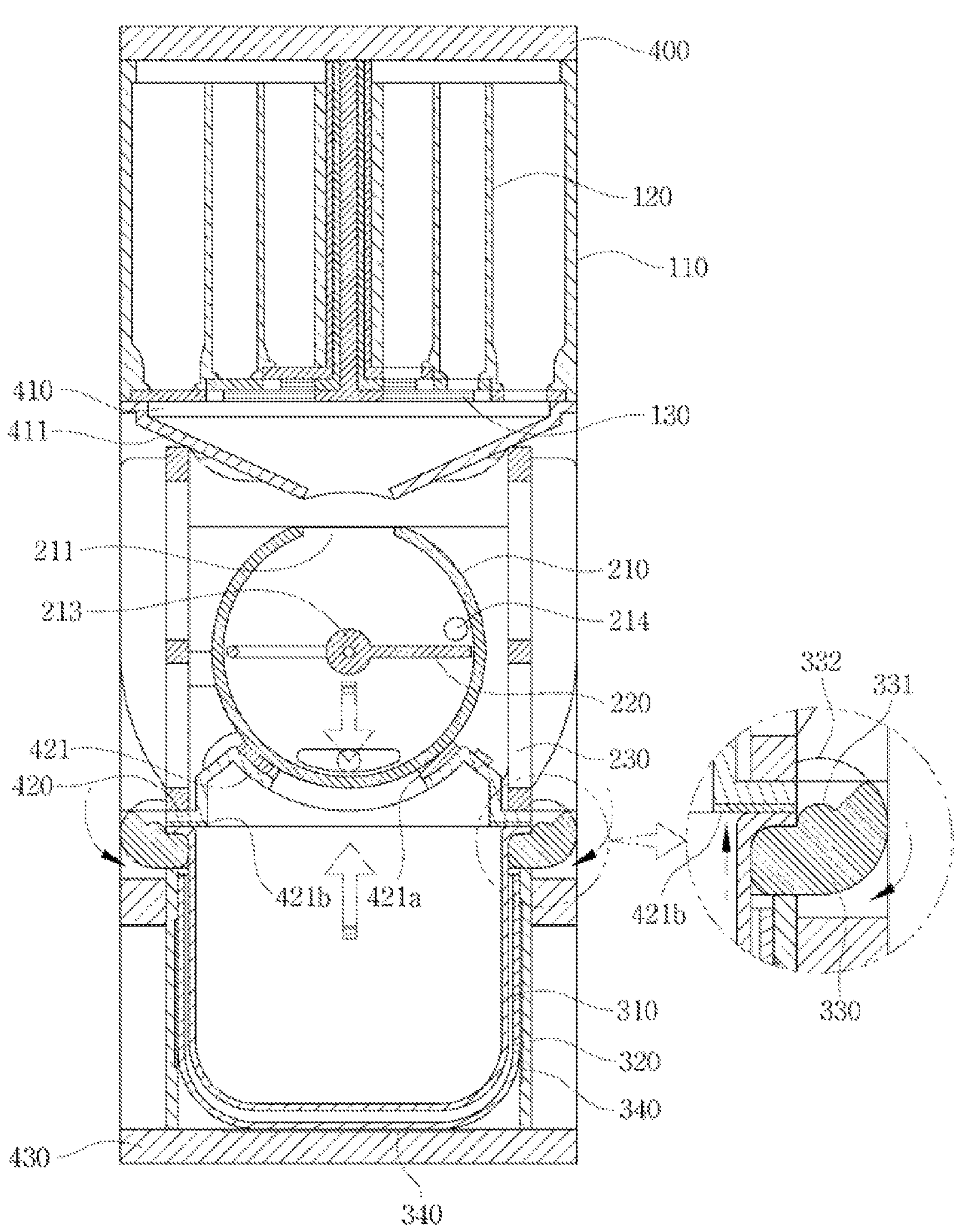
FIG. 18 is a front cross-sectional view illustrating a state in which an inner pot body is moved up by a traction driver in a cooker in an unattended-cooking rice cooker device according to the present invention.

After washing is done in the washer 200, the washing drum 210 is rotated forward by the drum rotating motor 212, discharging the cooking ingredient, washed in the washer 200, to the cooker 300. If the washing drum 210 is rotated reversely to let the inlet slot 211 face up, the first cam 250 and the second camp 260, which are pressurizers installed on the upper portions of the two opposite ends of the washing drum center shaft 213 as shown in FIG. 17, are rotated and moved down, pressing the washing drum center shaft 213 and thereby moving the washing drum 210 down.

The first cam 250 and the second cam 260 are installed to be rotatable by a first cam driver 251 and a second cam driver 261 fixedly installed on the frame 230. The first cam driver 251 and the second cam driver 261 may include motors. The pressurizer functions to lower the washing drum and may be replaced with, e.g., a hydraulic or pneumatic cylinder or chain rotator, equivalent thereto.

The first cam 250 is positioned on the front surface of the washing drum 210 and is disposed to cross the washing drum center shaft 213 protruding outward of the washing drum 210. The first cam driver 251 is installed on one side of the first cam 250, and the support 253 is provided on the opposite side to support the first cam 250.

The first cam 250 has a semi-circular cross section. When washing of the cooking ingredient is performed in the washing drum 210, the flat surface of the first cam 250 faces downward and, when cooking is ready after the cooking ingredient washed in the washing drum 210 is discharged to the cooker 300, the first cam 251 is rotated by the first cam driver 251 to let the rounded surface of the semi-circular shape to face downward and presses down and lower the washing drum center shaft 213.

In this case, the second cam 260 is also moved down by the second cam driver 261, pressing down the washing drum center shaft 213. As the washing drum center shaft 213 is pressed down on two opposite sides by the first cam 205 and the second cam 260, the washing drum 210 is lowered.

The second cam 260 has a protruding shape that is positioned inside the second cam driver 261 normally and, if the second cam driver 261 operates, is protruded down the second cam driver 261.

The first cam and the second cam which are pressurizers may be operated simultaneously or sequentially after the cooking is ready. The pressurizers may press down the washing drum 210 itself, rather than the washing drum center shaft 213.

Meanwhile, as shown in FIGS. 11 and 17, in the washer 200, the washing drum center shaft 213 penetrates the frame 230, and the washing drum 210 is rotatably installed in the frame 230. A slide 240 including a bearing is provided on the outer circumferential surface of the drum rotating motor 212 that rotates the washing drum 210 in the frame 230.

The drum rotating motor 212 is formed so that its vertical length is larger than its horizontal length. The slide 240 is formed to be elongated in the vertical direction while receiving the drum rotating motor 212 and holds the drum rotating motor not to shake when the washing drum 210 rotates. The washing drum 210 contains the cooking ingredient and is thus heavy. The drum rotating motor 210 is a small component installed outside. The slide 240 holds the drum rotating motor 210 not to be rotated together with the washing drum 210 which is heavy. Further, the slide 240 may allow the drum rotating motor 212 to be moved down along the bearing when the washing drum 210 is lowered by the pressurizer.

The slide 240 allows for reciprocation in the vertical direction according to the operation of the pressurizer and may be replaced with another component that provides both the rotation and vertical reciprocation.

The drum rotating motor 212 is moved up or down along the slide 240, and an upper stopper 241 and a lower stopper 242 are formed on the upper side and lower side, respectively, of the slide 240, limiting the moving distance of the drum rotating motor 212.

If the pressing force of the pressurizer is released, the washing drum center shaft 213 is lifted by a first elastic body 252 and a second elastic body 262 inserted in the lower inner portions of a first through hole 231*a* and a third through hole 233*a* through which the washing drum center shaft 213 pass in the frame 230.

Figure 19:
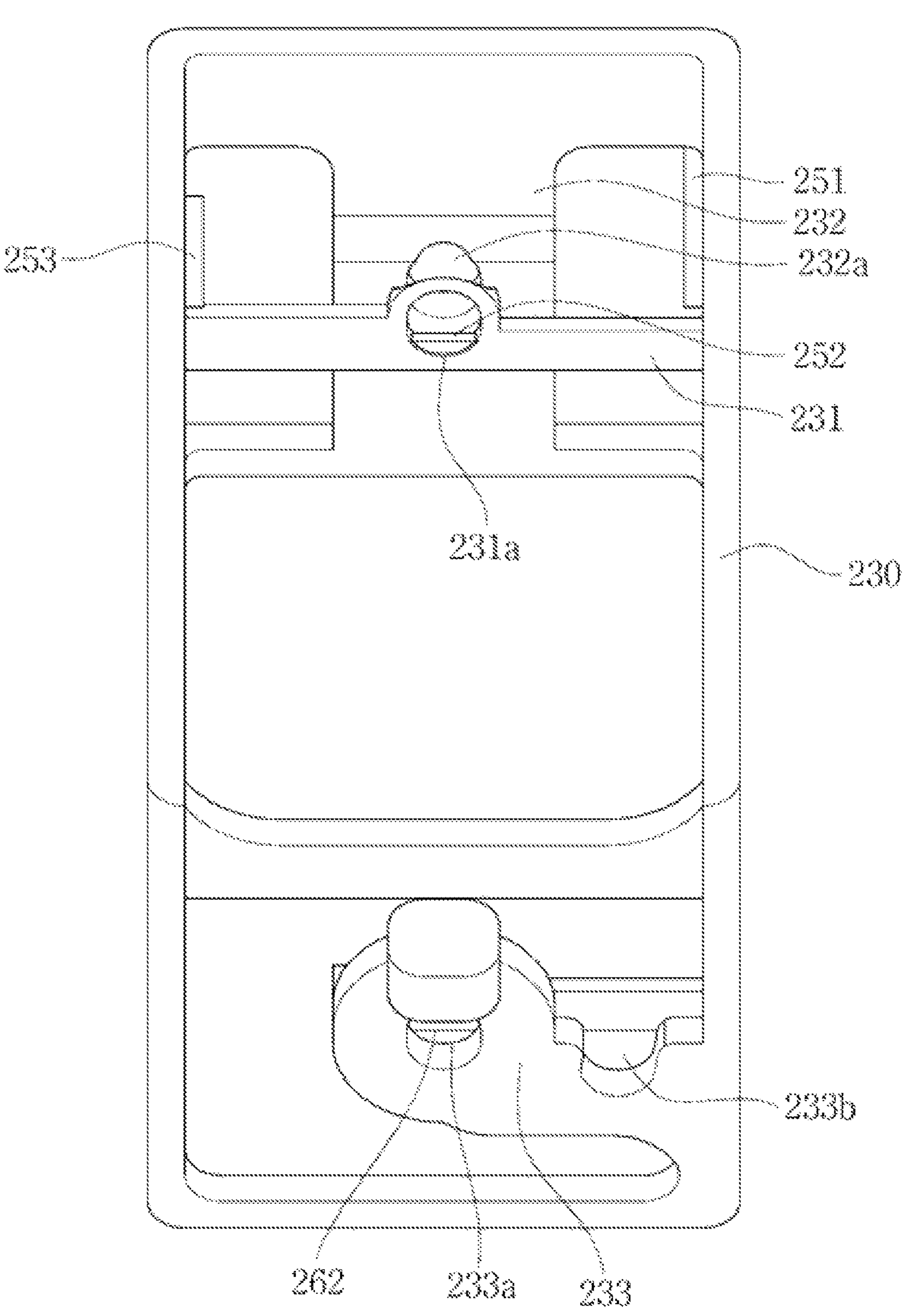
FIG. 19 is a perspective view illustrating a frame in a washer of an unattended-cooking rice cooker device according to the present invention.
Figure 20:
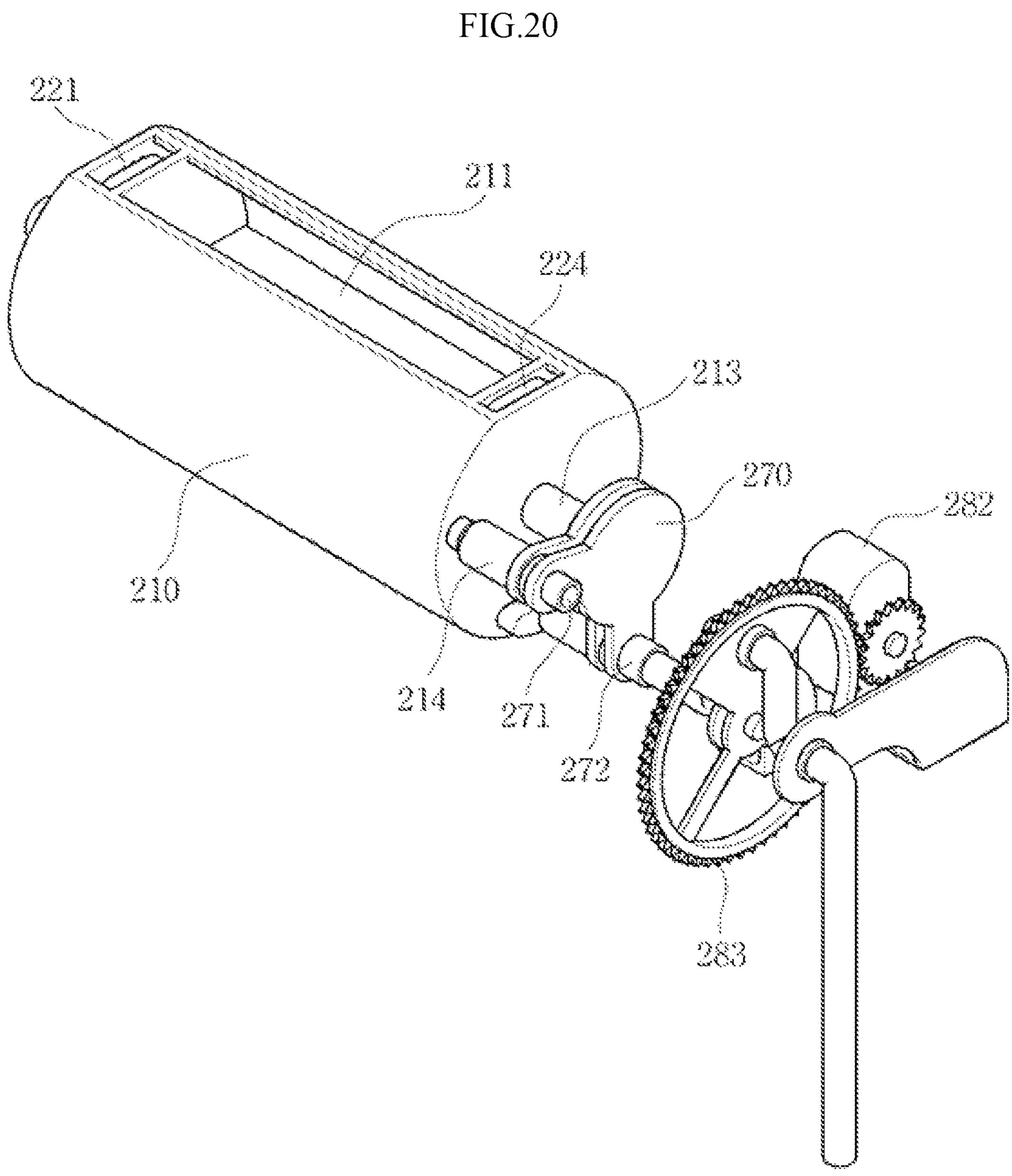
FIG. 20 is a perspective view illustrating a water discharge structure behind a water drain hole of an unattended-cooking rice cooker device according to the present invention.
Figure 21:
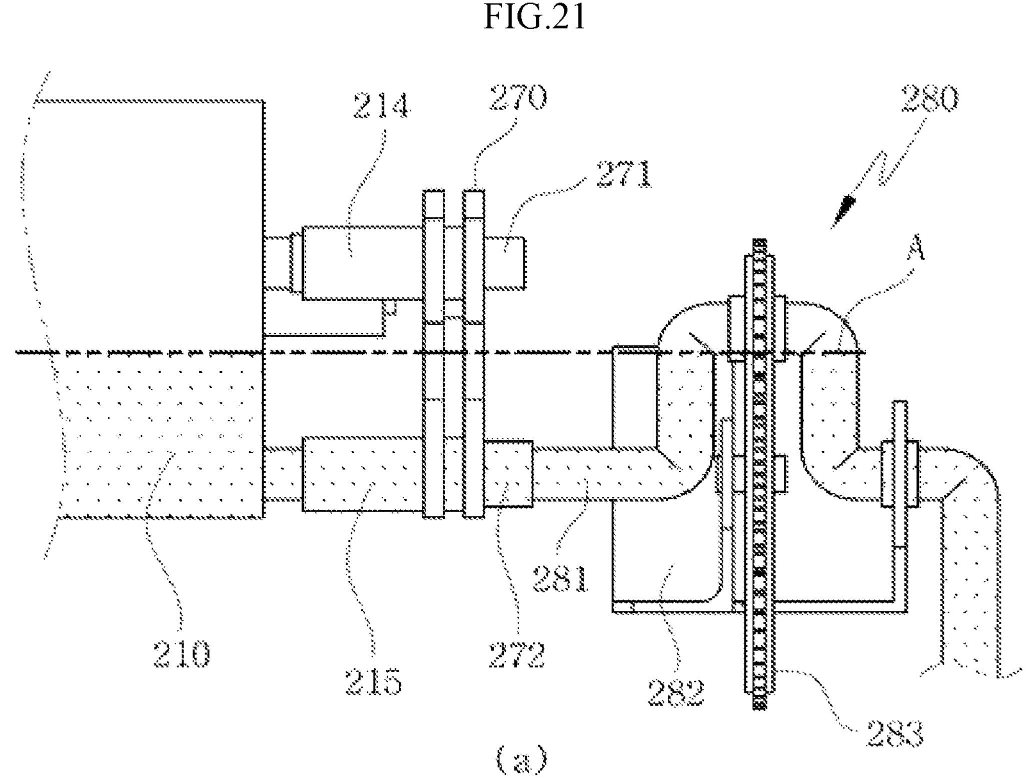
FIG. 21A is a cross-sectional view illustrating a trap pipe when water is introduced.
FIG. 21B is a cross-sectional view illustrating a trap pipe when water is discharged.
Figure 21:
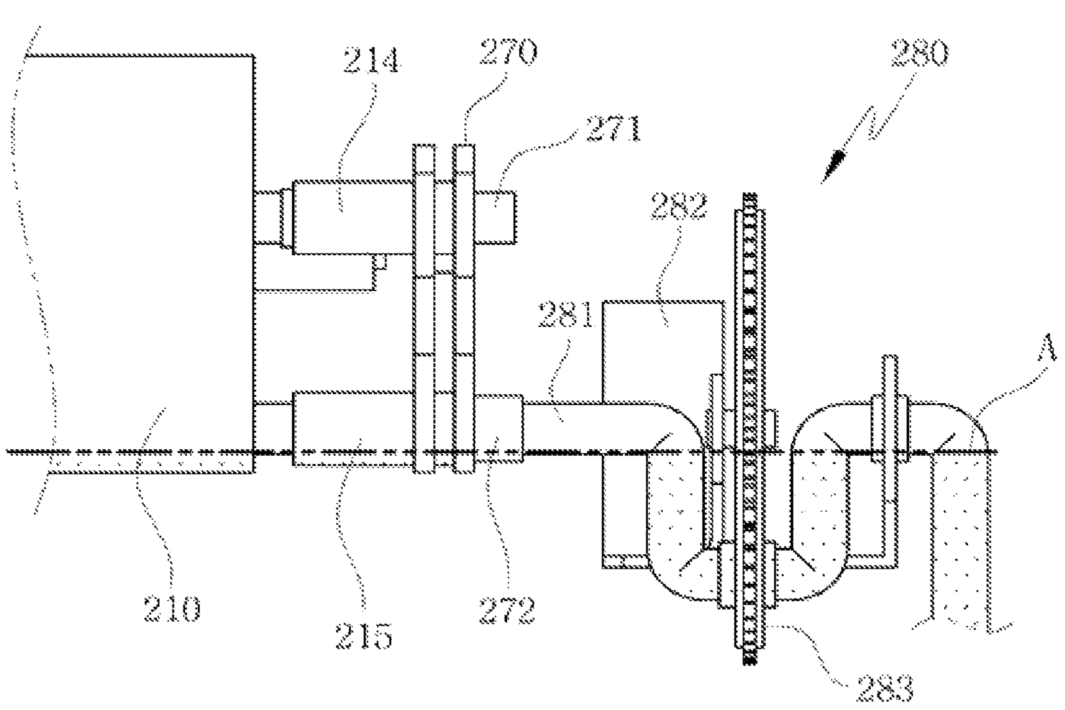

As shown in FIG. 19, the frame 230 of the washer 200 includes a first center shaft support 231 having the first through hole 231*a* penetrated by the washing drum center shaft 213 from the front surface of the washing drum 210, a second center shaft support 232 having a second through hole 232*a*, and a third center shaft support 233 having the third through hole 233*a* penetrated by the washing drum center shaft 213 from the rear surface of the washing drum 210. The first elastic body 252 is inserted into the first through hole 231*a*, and the second elastic body 262 is inserted into the third through hole 233*a*.

The first elastic body 252 and the second elastic body 262 may be springs and be provided to lift the washing drum center shaft 213.

The washing drum center shaft 213 of the washing drum 210 may be lifted by the elastic bodies alone or may be forcedly lifted by a lifting driver, such as the first cam 250 and the second cam 260 under the washing drum center shaft 213.

A water inlet 214 and a water outlet 215 are formed in the rear surface of the washing drum 210. The water inlet 214 and the water outlet 215 are coupled to a water introducing valve coupler 271 and a water discharging valve coupler 272 formed in a valve coupler 270 rotatably installed on the housing 400, and the valve coupler 270 is lifted and lowered together with the washing drum 210. The front surface of the washing drum 210 may be inclined to be slightly higher than the rear surface of the washing drum 210 to facilitate water drainage through the water outlet 215. If the front surface is positioned higher than the rear surface by about 3° to 5°, water may be easily discharged from the inside.

The water introducing valve coupler 271 is connected with a water supply hose (not shown) connected with a water purifier (not shown) to supply water to the inside of the washing drum 210 through the water inlet 214, and the water discharging valve coupler 272 is connected with a water discharge hose (not shown) for drain out the water.

The water supply hose and the water discharge hose respectively connected to the water introducing valve coupler 271 and the water discharging valve coupler 272 are flexible pipes, such as bellows or multi-axis pipes, which may be flexibly moved when the washing drum 210 is rotated.

The water outlet 215 is closed while washing the cooking ingredient and is opened when draining the water, through an open/close valve, e.g., a solenoid.

The valve coupler 270 has protrusions formed on two sides of a circular plate to be coupled with the water introducing valve coupler 271 and the water discharging valve coupler 272. Another circular plate of the same shape is spaced apart from the circular plate and is coupled with the circular plate. The valve coupler 270 is rotatably installed on a valve coupler support 422 of the housing 400, which is inserted in the space between the circular plates.

The water introducing valve coupler 271 is coupled with the water inlet 214 and, when the washing drum 210 is rotated, is seated on a water introducing support 233*b* formed in the frame 230, limiting the rotation angle of the washing drum 210 to 180 degrees.

Meanwhile, according to another embodiment of the present invention, it is possible to drain water without using an open/close valve in the water outlet 215. The water discharge from the washing drum 210 may contain starch which comes from the cooking ingredient and may be accumulated in the water outlet to clog the pipe or jams to the open/close valve driver.

A U-shaped pipe trap 281 which is moved up or down is coupled to the water discharging valve coupler 272 of the water outlet 215. The U-shaped pipe trap 281 is coupled to an elevator 283 coupled to a pipe rotating motor 282 and is moved up or down as the elevator 283 is rotated by the rotation of the pipe rotating motor 282. The pipe trap 281 suffices as long as it contains water during ascent and descent of the pipe and may be, e.g., a corrugated pipe, a multi-joint pipe, or any flexible pipe to interact with the rotation of the washing drum 210 and the pipe rotating motor 282. The pipe rotating motor 282 may be replaced with a cylinder capable of moving up and down the pipe trap 281.

The pipe trap 281 is coupled to the rear surface of the water discharging valve coupler 272 and is coupled to the elevator 283 which is moved up or down by the rotation of the pipe rotating motor 282 to ascend or descend and to be positioned higher or lower than a lower end of the washing drum 210. Without an open/close valve, the pipe trap 281 may ascend to trap water in the washing drum 210 and descend to discharge water out of the washing drum 210.

FIG. 21A shows an ascending state of the pipe trap 281 in which the lower end of the trap is positioned on the water level line A which is the water level inside the washing drum 210. FIG. 21B shows a descending state of the pipe trap 281 in which the water is drained out the washing drum 210.

The descending position of the pipe trap 281 is positioned lower than the bottom of the washing drum 210 so that the draining water is partially trapped in the pipe trap, preventing entrance of odor or bugs from the drain side. When water is introduced into the washing drum, and the cooking ingredient is washed by the blade, the pipe trap is elevated by the rotation of the elevator 283, allowing water to be trapped in the washing drum even without a separate open/close valve. In this case, since the amount of water introduced varies depending on the amount of the cooking ingredient, the ascending height of the water outlet may be changed according to the amount of the cooking ingredient, and the water level inside the washing drum is determined according to the operated position of the elevator.

In such an embodiment, water supply, washing, and water drain are controlled through the ascent and descent of the pipe trap connected to the elevator without the need for an open/close valve in water introduction and drain. During water drain, the starch-containing water is immediately discharged to the pipe trap, which is in the lower position, without staying in the pipe and, during water supply or washing, the pipe trap is elevated and emptied without water, thus reducing the likelihood of starch build-up in the pipe and fundamentally preventing jams to the valve driver.

In the washing drum 210, if the cooking ingredient is supplied through the dispenser 130, water is supplied through the water inlet 214, and the washing blade 22 repeats forward and reverse rotation to wash the cooking ingredient, and after washing, the water is discharged through the water outlet 215.

After performing the washing operation multiple times, the washing drum 210 is rotated forward to allow the inlet slot 211 to be positioned on the inner pot body 310 of the cooker 300.

Simultaneously, the squeezing blade 223 repeats forward and reverse rotation, putting the cooking ingredient through the inlet slot 211 to the inside of the inner pot body 310.

At this time, water for cooking is also supplied through the water inlet 214.

Then, the washing drum 210 is rotated backward to the original position. A slight gap d is formed between the upper end of the inner pot body 310 and the washing shelf 420 to allow the inner pot body 310 to slide in/out of the housing 400. Specifically, the upper end of the inner pot body 310 has a shape corresponding to a lower portion of the washing drum support 421 of the washing shelf and a slight gap exists therebetween. Further, since the washing drum 210 of the washer 200 should also be rotated in the forward and reverse directions, a slight gap is formed between the washing drum 210 and the washing drum support 421 of the washer 420.

Thereafter, if the traction driver 330 in tight contact with the two opposite edge portions 311 of the inner pot body 310 is driven to lift the inner pot body 310, the washing drum 210 may function as a lid of the inner pot body 310.

Meanwhile, the washing drum support 421, which supports the washing drum 210 lowered in the housing 400, has a first packing 421*a* on the surface that the washing drum 210 contacts, and a second packing 421*b* on the surface that the edge portion 311 of the inner pot body 310 contacts.

As such, the washing drum 210 and the inner pot body 310 are brought in tight contact to each other without leaving a gap, with the washing drum support 421 interposed therebetween, by the first packing 421*a* and the second packing 421*b*. The washing drum support 421 has an open center portion through which the lower portion of the washing drum 210 is inserted to become the upper surface of the inner pot body 310.

When the cooking ingredient is supplied to the inside of the inner pot body 310, the lower outer surface of the washing drum 210 and the washing drum support 421 are spaced apart from emission area by a predetermined gap d.

During cooking, the washing drum 210 is lowered by the force of pressing down the washing drum center shaft 213 by the pressurizers (first cam 250 and second cam 260) and comes in tight contact with the upper surface of the washing drum support 421 and, as the inner pot body 310 is lifted by the traction driver 330, the washing drum 210 comes in tight contact with the lower surface of the washing drum support 421 to serve as a lid (cover) of the inner pot body 310.

During cooking, the inner pot body 310 on the cooker shelf 430 of the housing 400 is heated by the heating unit 340 provided on the lower surface, rear surface, and two side surfaces of the inner pot body 310.

Figure 13:
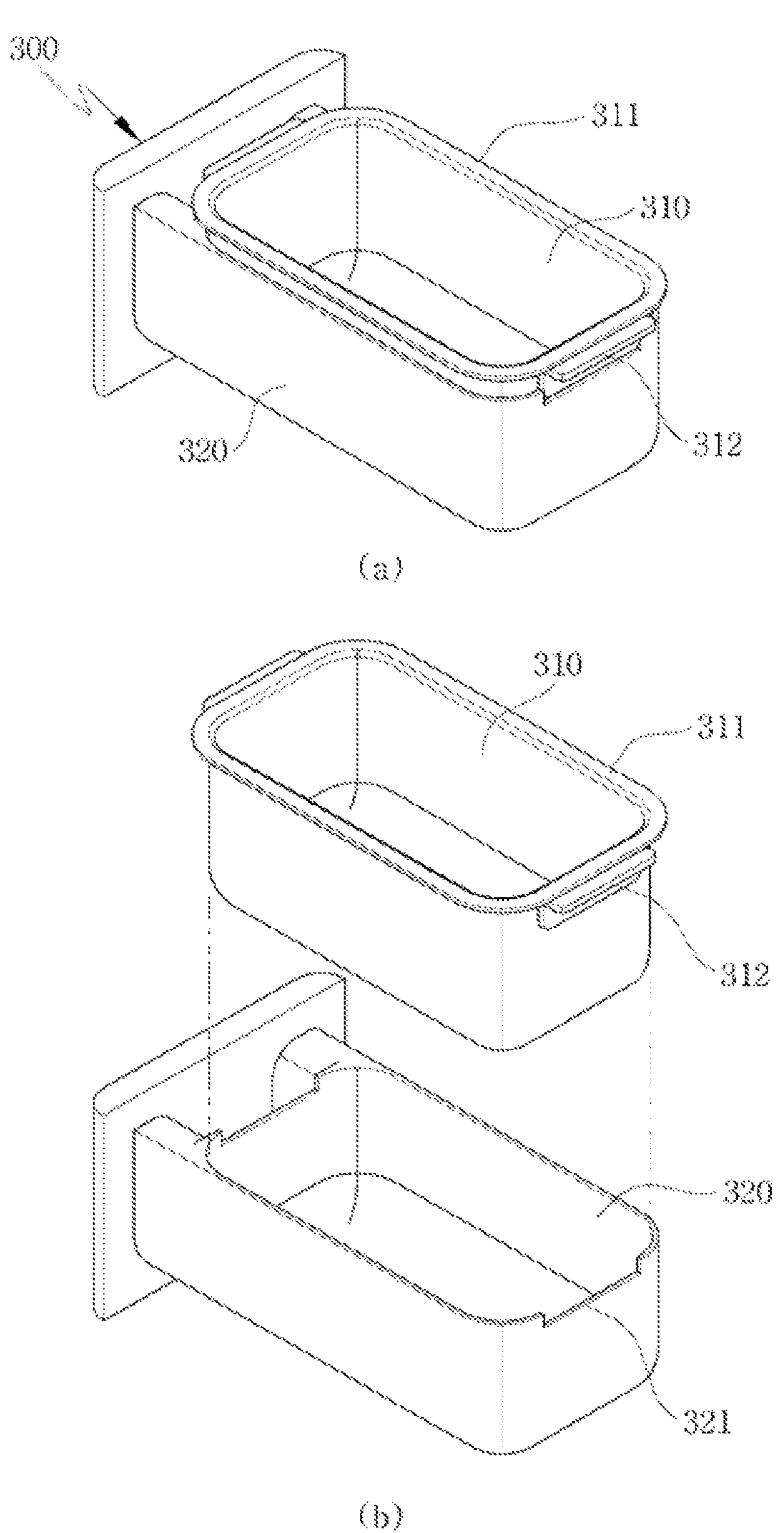
FIG. 13A is an assembled, perspective view illustrating a cooker in an unattended-cooking rice cooker device according to the present invention.
FIG. 13B is an exploded, perspective view illustrating a cooker in an unattended-cooking rice cooker device according to the present invention.
Figure 14:
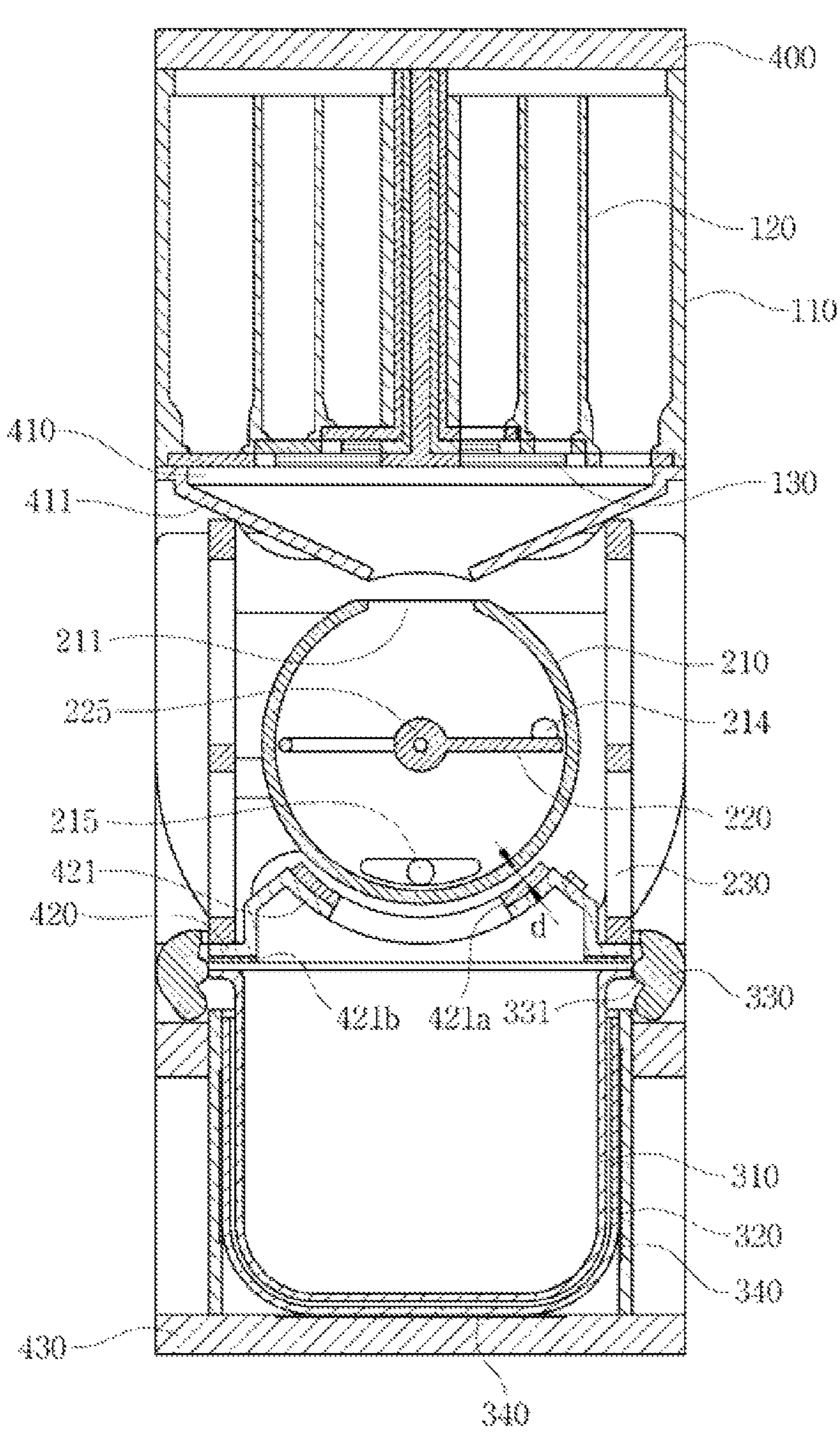
FIG. 14 is a front cross-sectional view illustrating an unattended-cooking rice cooker device according to the present invention.

As shown in FIG. 13, the inner pot body 310 has handles 312 formed on two opposite sides of the top edge and is put in a container 320 that may be drawn in and out on the cooker shelf 430. The container 320 has handle insertion recesses 321 where the handles 312 are seated, so that the user may safely put in or pull out the heated inner pot body 310.

The traction driver 330 which lifts and lowers the inner pot body 310 has a traction driver shaft 331 in the center, and a traction driving motor 332 for rotating the traction driver shaft 331 is provided on an edge thereof.

Meanwhile, the washing drum 210 is disposed so that the front surface is positioned slightly higher than the rear surface thereof to drain water. The washing drum support 421 which is an upper portion of the washer shelf 420 is formed to have the same angle as the washing drum 210.

A cable insertion part 225*a* is formed inside the blade rotation shaft 225, and electricity may be supplied through the cable insertion part 225*a*.

A cooking process through the so configured unattended-cooking rice cooker device of the present invention is described.

Figure 15:
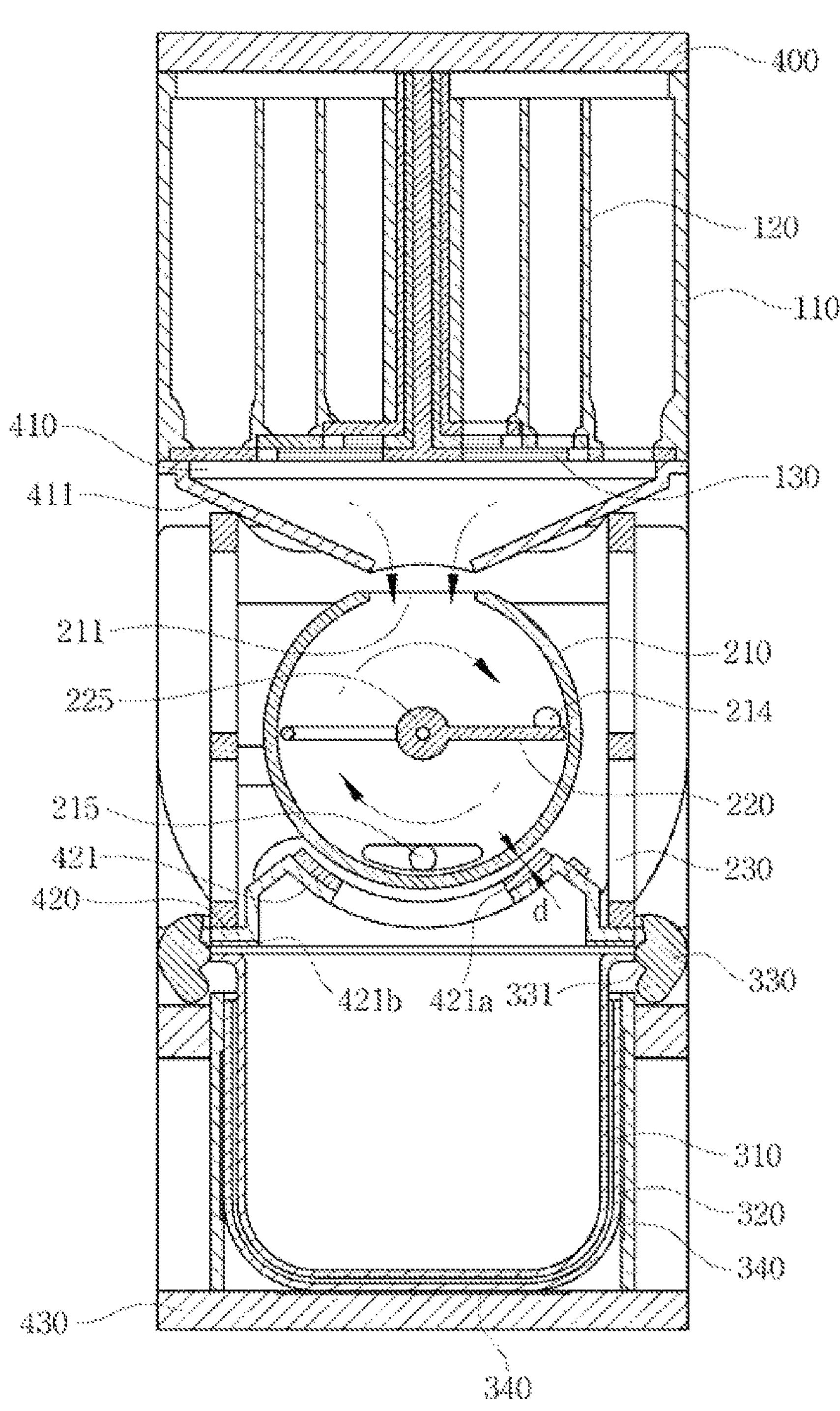
FIG. 15 is a front cross-sectional view illustrating dispensing and washing operations of an unattended-cooking rice cooker device according to the present invention.
Figure 16:
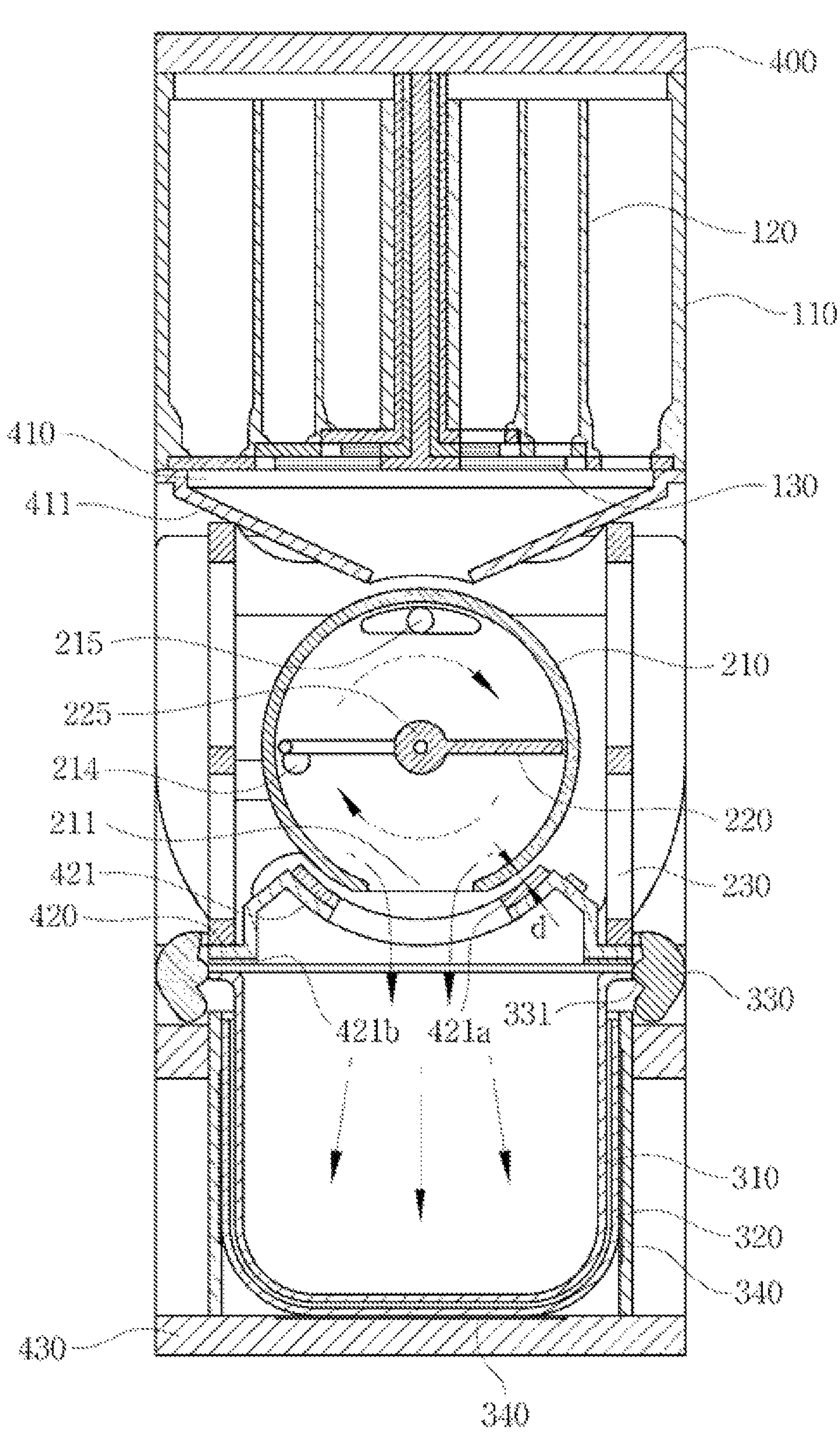
FIG. 16 is a front cross-sectional view illustrating washing a cooking ingredient in a washer and then moving it to a cooker in an unattended-cooking rice cooker device according to the present invention.

As shown in FIGS. 15 and 16, a controller (not shown) operates the dispenser 130 provided in the cartridge 120 of the storage drum part 110.

The cooking ingredient stored in the storage space 122 of the cartridge 120 drops through the discharge port provided in the dispenser 130 to the feeding guide 411 and is then supplied through the inlet slot 211 to the washing drum 210.

Then, water is supplied into the washing drum 210 through the water inlet 214. The blade rotation shaft 225 is rotated in the forward and reverse directions, repeatedly rotating the washing blade 222 in the forward and reverse directions to wash the cooking ingredient.

After washing, the water is discharged through the water outlet 215. Such washing is performed multiple times and, if washing is finally done, the washing drum 210 is overturned by 180 degrees. At this time, the inlet slot 211 provided in the washing drum 210 is positioned on the open top of the inner pot body 310.

In this state, the blade 220 is rotated in the forward and reverse directions through the blade rotation shaft 225, so that the squeezing blade 223 is rotated in the forward and reverse directions to sweep down the cooking ingredient (at this time, water is also supplied) to the inner pot body 310 through the inlet slot 211.

If all the cooking ingredient is supplied to the inner pot body 310 through the inlet slot 211, the washing drum 210 is rotated back to the original position.

Then, the inner pot body 310 is lifted by the traction driver, and the washing drum 210 is lowered by the pressurizer, so that the inner pot body 310 comes in tight contact to the lower surface of the washing drum support 421, i.e., the washer shelf 420 of the housing 400, and the washing drum 210 comes in tight contact to the upper surface of the washing drum support 421. Then, electricity is supplied to perform cooking.

In this case, the washing drum 210 functions as a lid of the inner pot body 310.

In this state, the inner pot body 310 is heated for cooking. If so, the washing drum 210 is heated by the cooking heat to completely remove the moisture remaining in the washing drum 210.

The present invention may completely evaporate the moisture remaining in the washing drum 210 during cooking, thereby fundamentally preventing germ growth and thus providing a sanitary rice cooker. During or after cooking, steam is discharged through the steam outlets 423 formed in the washing drum support 421, as necessary.

After cooking is done, the washing drum 210 releases the force of the pressurizer pressing down the washing drum center shaft 213 and is lifted by elasticity of the first elastic body 252 and the second elastic body 262.

Further, the force of pressing from under the edge portion 311 is released by the reverse rotation of the traction driver 330, so that the inner pot body 310 is lowered. The washing drum 210 and the inner pot body 310 are spaced apart from the washer shelf 420, and the inner pot body 310 is subjected to a state in which it slides forward.

As described above, the unattended-cooking rice cooker device of the present invention includes the feeder 100 for separately storing and supplying rice or other grains, which is the cooking ingredient, the washer 200 for receiving the cooking ingredient from the feeder 100 and washing the cooking ingredient by forward and reverse rotations, and the cooker 300 for receiving the washed cooking ingredient from the washer 200 and cooking the cooking ingredient. After the cooking ingredient is introduced, the cooker 300 is moved up, and the washer 200 is moved down so that the washing drum 210 itself of the washer 200 serves as a lid (cap). Thus, it is possible to simplify the configuration of the cooking device by enabling cooking without the need for separate valves, thereby providing an economical effect.

In the unattended-cooking rice cooker device of the present invention, the feeder 100, the washer 200, and the cooker 300 may be drawn in or out of the housing 400. As the washer 200 is removable, cleaning and repair are easy.

Further, in the unattended-cooking rice cooker device of the present invention, the washing blade 222 is provided to wash the cooking ingredient supplied into the washer 200. The washing blade stirs and washes the cooking ingredient while minimizing the fall-off of rice germs. Provided together with the washing blade is the squeezing blade 223 that sweeps down the washed cooking ingredient to the inner pot body. Thus, it is possible to quickly wash the cooking ingredient while minimizing destruction of nutrients of the cooking ingredient.

Further, in the unattended-cooking rice cooker device of the present invention, the washing drum 210 is heated by the cooking heat from the cooker 300 during cooking, evaporating the moisture remaining in the washing drum 310 and thereby fundamentally preventing germ growth.

Further, in the unattended-cooking rice cooker device of the present invention, during cooking, the rice feeder, water drain, and water discharger are completely separated from the cooker 300 including the inner pot, and it is possible to prevent leakage of hot steams for cooking without the need for separate valves for maintaining high temperature and high pressure.

Further, in the unattended-cooking rice cooker device of the present invention, the cooking ingredient is separately stored and may be dispensed in a required amount for cooking. Thus, the unattended-cooking rice cooker device is appropriate for home use.

Further, in the unattended-cooking rice cooker device of the present invention, the washer 200 has an open top through which the cooking ingredient is introduced and discharged. As such, the unattended-cooking rice cooker device has a simplified structure.

Further, in the unattended-cooking rice cooker device of the present invention, it is possible to precisely measure and mix a plurality of types of grains through the dispenser 100.

Further, in the unattended-cooking rice cooker device of the present invention, a communication unit is provided to be able to mix, wash, and cook a required amount of grains remotely by a smartphone.

Further, in the unattended-cooking rice cooker device of the present invention, the inner pot has a front-load structure, reducing necessary space and eliminating separate valves. Thus, the unattended-cooking rice cooker device may be manufactured in compact size, does not require separate valves to thus reduce components, and provides advantageous, such as easy cleaning and maintenance.

Further, in the unattended-cooking rice cooker device of the present invention, water drain is controlled by the trap to prevent pipe clogging and jams to the valve driver due to foreign bodies generated during washing.

LIST OF COMPONENTS

100: feeder
110: storage drum part
111: first center shaft 112: second center shaft 113: third center shaft
120: cartridge
120*a*: large cartridge 120*b*: medium cartridge 120*c*: small cartridge
121: barrier plate 122: storage space 123: closing unit 124: third center shaft insertion hole
125: first partitioning plate 126: second partitioning plate
130: dispenser
131: first open/close plate 131*a*: first open/close driving gear
131*b*: first operating motor 131*c*: first discharge port 131*d*: first open/close plate
10 support
132: second open/close plate 132*a*: second open/close driving gear 132*b*: second operating motor
132*c*: second discharge port 132*d*: first center shaft insertion hole 132*e*: second open/close plate support
133: third open/close plate 133*a*: third open/close driving gear
133*b*: third operating motor 133*c*: third discharge port 133*d*: second center shaft insertion hole
140: controller 150: display
200: washer
210: washing drum
211: inlet slot 212: drum rotating motor 213: washing drum center shaft
214: water inlet 215: water outlet
216: washing drum center shaft insertion hole
220: blade
221: blade rotating motor 222: washing blade 223: squeezing blade
224: blade vibrating motor 225: blade rotation shaft
225*a*: cable insertion part
230: frame
231: first center shaft support 231*a*: first through hole
232: second center shaft support 232*a*: second through hole
233: third center shaft support 233*a*: third through hole 233*b*: water introducing support
240: slide
241: upper stopper 242: lower stopper
250: first cam
251: first cam driver 252: first elastic body 253: support
260: second cam
261: second cam driver 262: second elastic body
270: valve coupler
271: water introducing valve coupler 272: water discharging valve coupler
280: water discharging structure
281: pipe trap 282: pipe rotating motor
283: elevator A: water level line
300: cooker
310: inner pot body
311: edge portion 312: handle

320: container 321: handle insertion recess

330: traction driver 331: traction driver shaft 332: traction driving motor

340: heating unit

400: housing

410: feeder shelf 411: feeding guide

420: washer shelf

421: washing drum support 421*a*: first packing 421*b*: second packing

422: valve coupler support 423: steam outlet

430: cooker shelf

The invention claimed is:

1. An unattended-cooking rice cooker device, comprising:

a feeder (100) receiving and storing a cooking ingredient;

a washer (200) installed under the feeder (100) to wash the cooking ingredient; and a cooker (300) installed under the washer (200) to heat and cook the cooking ingredient supplied from the washer (200), wherein the feeder (100), the washer (200), and the cooker (300) slide in along a side surface of a housing (400) including a feeder shelf (410), a washer shelf (420), and a cooker shelf (430), wherein the feeder (100), the washer (200), and the cooker (300) are vertically arranged such that the cooking ingredient moves by gravity from the feeder (100) to the washer (200) and from the washer (200) to the cooker (300), the washer (200) includes an inlet slot (211) through which the cooking ingredient is introduced from the feeder (100) and a hollow washing drum (210) for washing the cooking ingredient, wherein wherein the washing drum (210) is rotatable to discharge the cooking ingredient through the inlet slot (211) by rotating the inlet slot (211) downward, wherein an inner pot body (310) in the cooker (300) receiving the cooking ingredient from the washing drum (210) is spaced apart from a bottom of the washer shelf (420), wherein the washing drum (210) is spaced apart from a top of the washer shelf (420) having a curve corresponding to an outer shape of the washing drum (210), wherein the inlet slot (211), which is an opening formed in a top of the washing drum (210), serves as both an inlet for receiving the cooking ingredient and an outlet for discharging the cooking ingredient into the inner pot body (310) by being rotated downward after washing, after washing, the washing drum (210) is rotated downward to the inner pot body (310); wherein during cooking, the washing drum (210) is pressed down and lowered by a pressurizer to come in tight contact with the washer shelf (420), and the inner pot body (310) is pressed and lifted by a traction driver (330) to come in tight contact with the washer shelf (420) so that the washing drum (210) serves as a lid of the inner pot body (310), and whereby heat from the inner pot body (310) during cooking is transferred to the washing drum (210) to evaporate moisture therein.

2. The unattended-cooking rice cooker device of claim 1, wherein the pressurizer pressurizes a washing drum center shaft (213) coupled to a blade rotation shaft (225) coupled with a blade (220), the blade (220) positioned inside the washing drum to wash the cooking ingredient supplied to an inside of the washing drum (210) and supplying the washed cooking ingredient to the cooker (300).

3. The unattended-cooking rice cooker device of claim 1, wherein the traction driver (330) is rotated while in tight contact with the inner pot body (310) to lift the inner pot body (310).

4. The unattended-cooking rice cooker device of claim 1, wherein the washing drum (200) includes a protruding washing drum center shaft (213), wherein a slide (240) including a bearing is provided to be elongated in a vertical direction on an outer circumferential surface of a drum rotating motor (212) for rotating the washing drum (210) in a frame (230) where the washing drum (210) is rotatably installed, wherein the drum rotating motor (212) is moved down along the slide (240) when the washing drum (210) is lowered by the pressurizer and, when a pressing force of the pressurizer is released, the washing drum center shaft (213) is lifted by a first elastic body (252) and a second elastic body (262) inserted into an inner lower portion of a through hole penetrated by the washing drum center shaft (213) in the frame (230).

5. The unattended-cooking rice cooker device of claim 1, wherein the cooker (300) includes the inner pot body (310) to which the cooking ingredient is supplied through the inlet slot (211) of the washer (200) to be cooked, a container (320) in which the inner pot body (310) is put, the traction driver (330) lifting or lowering the inner pot body (310), and a heating unit (340) including a heater to heat the inner pot body (310).

6. The unattended-cooking rice cooker device of claim 1, wherein the washer shelf (420) includes an open center and wherein the washer shelf (420) has an upper portion having a shape of the washing drum (210) to be tightly contacted by the washing drum (210) when the washing drum (210) is pressed and lowered by the pressurizer has a lower portion having a shape of the inner pot body (310) to be tightly contacted by the inner pot body (310) when the inner pot body (310) is pressed and lifted by the traction driver (330).

7. The unattended-cooking rice cooker device of claim 1, wherein the feeder (100) includes a hollow storage drum part (110) having an open top and an open bottom; a cartridge (120) provided in a space formed inside the storage drum part (110) and having a plurality of storage spaces (122) formed by a plurality of barrier plates (121) installed at a predetermined interval along a circumferential direction around a center axis; and a dispenser (130) installed under the cartridge (120) to open a bottom of any one of the plurality of storage spaces (122) to discharge content.

8. The unattended-cooking rice cooker device of claim 1, wherein the washing drum (210) is disposed to be inclined so that a front surface thereof is higher than a rear surface thereof, and wherein the washer shelf (420) has an upper portion formed at a same angle as the washing drum (210).

9. The unattended-cooking rice cooker device of claim 1, further comprising a display (150) including a controller, formed on a side of the feeder (100), the washer (200), or the cooker (300), wherein the controller includes a keypad for receiving an input directly from a user and a wireless communication unit for receiving a signal from a remote terminal.

10. An unattended-cooking rice cooker device, comprising:

a feeder (100) receiving and storing a cooking ingredient;

a washer (200) installed under the feeder (100) to wash the cooking ingredient; and a cooker (300) installed under the washer (200) to heat and cook the cooking ingredient supplied from the washer (200), wherein the feeder (100), the washer (200), and the cooker (300) slide in along a side surface of a housing (400) including a feeder shelf (410), a washer shelf (420), and a cooker shelf (430), wherein the washer (200) includes an inlet slot (211) through which the cooking ingredient is introduced from the feeder (100) and a hollow washing drum (210) for washing the cooking ingredient, wherein an inner pot body (310) in the cooker (300) receiving the cooking ingredient from the washing drum (210) is spaced apart from a bottom of the washer shelf (420), wherein the washing drum (210) is spaced apart from a top of the washer shelf (420) having a curve corresponding to an outer shape of the washing drum (210), wherein during cooking, the washing drum (210) is pressed down and lowered by a pressurizer to come in tight contact with the washer shelf (420), and the inner pot body (310) is pressed and lifted by a traction driver (330) to come in tight contact with the washer shelf (420) so that the washing drum (210) serves as a lid of the inner pot body (310), wherein the pressurizer pressurizes a washing drum center shaft (213) containing a blade rotation shaft (225) coupled with a blade (220), the blade (220) positioned inside the washing drum to wash the cooking ingredient supplied to an inside of the washing drum (210) and supplying the washed cooking ingredient to the cooker (300), wherein the blade (220) of the washer (200) includes a washing blade (222) washing the cooking ingredient and a squeezing blade (223) supplying the washed cooking ingredient to the cooker (300), wherein the washing blade (222) includes a frame (p) fixed lengthwise to the blade rotation shaft (225) and a plurality of spacing rods (r) installed in the frame (p) to allow the cooking ingredient to be washed while passing through gaps between the spacing rods (r), and wherein the squeezing blade (223) is coupled to the washing drum center shaft (213) to be positioned opposite to the washing blade (222), the squeezing blade (223) having a plate shape to sweep the washed cooking ingredient.

11. An unattended-cooking rice cooker device, comprising:

a feeder (100) receiving and storing a cooking ingredient;

a washer (200) installed under the feeder (100) to wash the cooking ingredient; and a cooker (300) installed under the washer (200) to heat and cook the cooking ingredient supplied from the washer (200), wherein the feeder (100), the washer (200), and the cooker (300) slide in along a side surface of a housing (400) including a feeder shelf (410), a washer shelf (420), and a cooker shelf (430), wherein the washer (200) includes an inlet slot (211) through which the cooking ingredient is introduced from the feeder (100) and a hollow washing drum (210) for washing the cooking ingredient, wherein an inner pot body (310) in the cooker (300) receiving the cooking ingredient from the washing drum (210) is spaced apart from a bottom of the washer shelf (420), wherein the washing drum (210) is spaced apart from a top of the washer shelf (420) having a curve corresponding to an outer shape of the washing drum (210), wherein during cooking, the washing drum (210) is pressed down and lowered by a pressurizer to come in tight contact with the washer shelf (420), and the inner pot body (310) is pressed and lifted by a traction driver (330) to come in tight contact with the washer shelf (420) so that the washing drum (210) serves as a lid of the inner pot body (310), wherein a water inlet (214) and a water outlet (215) are formed on a rear surface of the washing drum (210), and wherein a pipe trap (281) is connected to the water inlet (215), a height of the pipe trap (281) varied when water is introduced and when the water is discharged.

12. The unattended-cooking rice cooker device of claim 11, wherein the pipe trap (281) is coupled to an elevator (283) which ascends or descends, and wherein the pipe trap (281) is lifted or lowered to be positioned higher or lower than a height of a lower end of the washing drum (210) by an operation of the elevator (283).

* * * * *